(12) United States Patent
Peng et al.

(10) Patent No.: US 11,893,816 B2
(45) Date of Patent: Feb. 6, 2024

(54) DOCUMENT DETECTION IN DIGITAL IMAGES

(71) Applicant: PAYPAL, INC., San Jose, CA (US)

(72) Inventors: Shanshan Peng, Singapore (SG); Khine Phyo Yar, Singapore (SG); Yuzhen Zhuo, Singapore (SG)

(73) Assignee: PayPal, Inc., San Jose, CA (US)

( * ) Notice: Subject to any disclaimer, the term of this patent is extended or adjusted under 35 U.S.C. 154(b) by 166 days.

(21) Appl. No.: 17/458,090

(22) Filed: Aug. 26, 2021

(65) Prior Publication Data

US 2023/0061009 A1  Mar. 2, 2023

(51) Int. Cl.
*G06V 30/18* (2022.01)
*G06T 7/12* (2017.01)
*G06V 10/94* (2022.01)
*G06V 30/40* (2022.01)

(52) U.S. Cl.
CPC .............. *G06V 30/18* (2022.01); *G06T 7/12* (2017.01); *G06V 10/955* (2022.01); *G06V 30/40* (2022.01); *G06T 2207/10004* (2013.01)

(58) Field of Classification Search
USPC ........................................................ 382/199
See application file for complete search history.

(56) References Cited

U.S. PATENT DOCUMENTS

| | | | | |
|---|---|---|---|---|
| 9,230,382 B2* | 1/2016 | Smith | | G07D 7/04 |
| 10,140,691 B2* | 11/2018 | Zagaynov | | G06V 10/753 |
| 10,417,321 B2* | 9/2019 | Welinder | | G06V 10/10 |
| 2018/0025251 A1* | 1/2018 | Welinder | | G06F 40/123 |
| | | | | 382/199 |
| 2019/0197693 A1* | 6/2019 | Zagaynov | | G06T 11/203 |

OTHER PUBLICATIONS

Rosebrock; "How to Build a Kick-Ass Mobile Document Scanner in Just Five Minutes"; Pyimagesearch; Sep. 1, 2014; 148 pages.
Xiong; "Fast and Accurate Document Detection for Scanning"; Aug. 9, 2016; 15 pages.
Skoryukina et al.; "Real Time Rectangular Document Detection on Mobile Devices"; Seventh International Conference on Machine Vision (ICMV 2014), 2014, Milan, Italy; 7 pages.

(Continued)

*Primary Examiner* — Ishrat I Sherali
(74) *Attorney, Agent, or Firm* — Haynes and Boone, LLP

(57) ABSTRACT

Methods and systems are presented for detecting a boundary of a document within a digital image. Upon receiving an image, the image is converted into a binary image. One or more kernel-based transformations are performed on the binary image using a horizontal kernel and a vertical kernel. A plurality of edges are identified based on the one or more kernel-based transformations. The plurality of edges includes a plurality of horizontal edges and a plurality of vertical edges. Multiple quadrilaterals are constructed using different combinations of horizontal edges and vertical edges from the plurality of edges. A particular quadrilateral is selected from the multiple quadrilaterals based on how well the edges fit the perimeters of the quadrilaterals. The selected quadrilateral is used to define a boundary of the document within the digital image.

20 Claims, 19 Drawing Sheets

(56) References Cited

OTHER PUBLICATIONS

Ahmad-Montaser et al.; "Complex Document Classification and Localization Application on Identity Document Images"; 2017 14th IAPR International Conference on Document Analysis and Recognition; pp. 426-431.
Usilin et al.; "Visual Appearance Based Document Image Classification"; Proceedings of 2010 IEEE 17th International Conference on Image Processing; Sep. 26-29, 2010, Hong Kong; pp. 2133-2136.
Javed et al.; "Real-Time Document Localization in Natural Images by Recursive Application of a CNN"; 2017 14th IAPR International Conference on Document Analysis and Recognition; pp. 105-110.
Dobai et al.; A Document Detection Technique Using Convolutional Neural Networks for Optical Character Recognition Systems; ESANN 2019 proceedings, European Symposium on Artificial Neural Networks, Computational Intelligence and Machine Learning. Bruges (Belgium), Apr. 24-26, 2019, i6doc.com publ., ISBN 978-287-587-065-0; pp. 547-552.
Fan; "Detection of Quadrilateral Document Regions from Digital Photographs"; HP Labs, Palo Alto, California, USA; pp. 4321-4329.
Tropin et al.; "Approach for Document Detection by Contours and Contrasts"; 7 pages.
"Extract horizontal and vertical lines by using morphological operations"; https://docs.opencv.org/3.4/dd/dd7/tutorial_morph_lines_detection.html; 6 pages.

* cited by examiner

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| A | 0 | 0 | 0 | 0 | 0 | 0 | 0 | 0 | 0 | 0 | 0 | 0 | 0 | 0 | 0 |
| B | 0 | 0 | 0 | 0 | 0 | 1 | 0 | 0 | 0 | 0 | 0 | 0 | 0 | 0 | 0 |
| C | 0 | 1 | 0 | 1 | 0 | 0 | 1 | 0 | 1 | 0 | 0 | 0 | 0 | 0 | 0 |
| D | 0 | 0 | 1 | 1 | 1 | 1 | 1 | 1 | 0 | 0 | 0 | 0 | 0 | 0 | 0 |
| E | 0 | 0 | 1 | 1 | 0 | 1 | 1 | 1 | 0 | 0 | 0 | 0 | 0 | 0 | 0 |
| F | 0 | 0 | 0 | 0 | 1 | 0 | 1 | 0 | 0 | 0 | 0 | 0 | 0 | 0 | 0 |
| G | 0 | 0 | 0 | 1 | 0 | 0 | 0 | 0 | 0 | 0 | 0 | 0 | 0 | 0 | 0 |
| H | 0 | 0 | 0 | 0 | 0 | 0 | 0 | 0 | 0 | 0 | 0 | 0 | 0 | 0 | 0 |

|   | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| A | 0 | 0 | 0 | 0 | 0 | 0 | 0 | 0 | 0 | 0 | 0 | 0 | 0 | 0 | 0 |
| B | 0 | 0 | 0 | 0 | 0 | 0 | 0 | 0 | 0 | 0 | 0 | 0 | 0 | 0 | 0 |
| C | 0 | 0 | 0 | 0 | 0 | 0 | 0 | 0 | 0 | 0 | 0 | 0 | 0 | 0 | 0 |
| D | 0 | 0 | 1 | 1 | 1 | 1 | 1 | 1 | 0 | 0 | 0 | 0 | 0 | 0 | 0 |
| E | 0 | 0 | 0 | 0 | 0 | 1 | 1 | 1 | 0 | 0 | 0 | 0 | 0 | 0 | 0 |
| F | 0 | 0 | 0 | 0 | 0 | 0 | 0 | 0 | 0 | 0 | 0 | 0 | 0 | 0 | 0 |
| G | 0 | 0 | 0 | 0 | 0 | 0 | 0 | 0 | 0 | 0 | 0 | 0 | 0 | 0 | 0 |
| H | 0 | 0 | 0 | 0 | 0 | 0 | 0 | 0 | 0 | 0 | 0 | 0 | 0 | 0 | 0 |

|   | A | B | C | D | E | F | G | H |
|---|---|---|---|---|---|---|---|---|
| 15 | 0 | 0 | 0 | 0 | 0 | 0 | 0 | 0 |
| 14 | 0 | 0 | 0 | 0 | 0 | 0 | 0 | 0 |
| 13 | 0 | 0 | 0 | 0 | 0 | 0 | 0 | 0 |
| 12 | 0 | 0 | 0 | 0 | 0 | 0 | 0 | 0 |
| 11 | 0 | 0 | 0 | 0 | 0 | 0 | 0 | 0 |
| 10 | 0 | 0 | 0 | 0 | 0 | 0 | 0 | 0 |
| 9 | 0 | 0 | 1 | 0 | 0 | 0 | 0 | 0 |
| 8 | 0 | 0 | 0 | 1 | 1 | 0 | 0 | 0 |
| 7 | 0 | 0 | 1 | 1 | 1 | 1 | 0 | 0 |
| 6 | 0 | 1 | 0 | 1 | 1 | 0 | 0 | 0 |
| 5 | 0 | 0 | 0 | 1 | 0 | 1 | 0 | 0 |
| 4 | 0 | 0 | 1 | 1 | 1 | 0 | 1 | 0 |
| 3 | 0 | 0 | 0 | 1 | 1 | 0 | 0 | 0 |
| 2 | 0 | 0 | 1 | 0 | 0 | 0 | 0 | 0 |
| 1 | 0 | 0 | 0 | 0 | 0 | 0 | 0 | 0 |

Figure 5E

|   | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| A | 0 | 0 | 0 | 0 | 0 | 0 | 0 | 0 | 0 | 0  | 0  | 0  | 0  | 0  | 0  |
| B | 0 | 0 | 0 | 0 | 0 | 0 | 0 | 0 | 0 | 0  | 0  | 0  | 0  | 0  | 0  |
| C | 0 | 0 | 0 | 1 | 0 | 0 | 1 | 0 | 0 | 0  | 0  | 0  | 0  | 0  | 0  |
| D | 0 | 0 | 0 | 1 | 0 | 0 | 1 | 0 | 0 | 0  | 0  | 0  | 0  | 0  | 0  |
| E | 0 | 0 | 0 | 1 | 0 | 0 | 1 | 0 | 0 | 0  | 0  | 0  | 0  | 0  | 0  |
| F | 0 | 0 | 0 | 0 | 0 | 0 | 1 | 0 | 0 | 0  | 0  | 0  | 0  | 0  | 0  |
| G | 0 | 0 | 0 | 0 | 0 | 0 | 0 | 0 | 0 | 0  | 0  | 0  | 0  | 0  | 0  |
| H | 0 | 0 | 0 | 0 | 0 | 0 | 0 | 0 | 0 | 0  | 0  | 0  | 0  | 0  | 0  |

Figure 5G

|   | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| A | 0 | 0 | 0 | 0 | 0 | 0 | 0 | 0 | 0 | 0  | 0  | 0  | 0  | 0  | 0  |
| B | 0 | 0 | 0 | 0 | 0 | 0 | 0 | 0 | 0 | 0  | 0  | 0  | 0  | 0  | 0  |
| C | 0 | 0 | 0 | 1 | 0 | 0 | 1 | 0 | 0 | 0  | 0  | 0  | 0  | 0  | 0  |
| D | 0 | 0 | 1 | 1 | 1 | 1 | 1 | 1 | 0 | 0  | 0  | 0  | 0  | 0  | 0  |
| E | 0 | 0 | 0 | 1 | 0 | 1 | 1 | 1 | 0 | 0  | 0  | 0  | 0  | 0  | 0  |
| F | 0 | 0 | 0 | 0 | 0 | 0 | 1 | 0 | 0 | 0  | 0  | 0  | 0  | 0  | 0  |
| G | 0 | 0 | 0 | 0 | 0 | 0 | 0 | 0 | 0 | 0  | 0  | 0  | 0  | 0  | 0  |
| H | 0 | 0 | 0 | 0 | 0 | 0 | 0 | 0 | 0 | 0  | 0  | 0  | 0  | 0  | 0  |

Figure 5H

DOCUMENT DETECTION IN DIGITAL IMAGES

BACKGROUND

The present specification generally relates to image processing, and more specifically, to identifying a boundary of a document within a digital image according to various embodiments of the disclosure.

RELATED ART

With the advent of online services and smart mobile devices, users have been accustomed to being able to perform various types of transactions online, such as by following an online workflow via a user interface of a service provider. Even for certain transaction types that require submissions of physical documents, such as a photo identification document (e.g., a driver's license, a passport, etc.), a physical executed contract, physical financial documents, proof of residence, etc., the requirement can be fulfilled by the user capturing a digital image of the required physical document (e.g., using a camera of the mobile device, etc.) and transmitting the digital image to the service provider via the user interface.

It is beneficial for the service provider to determine information associated with the captured document as quickly as possible after the document is captured by the user device, such that the service provider may determine whether the submitted document satisfies a set of requirements (e.g., whether the submitted document corresponds to the required document type, whether the submitted document has missing information, etc.), and to prompt the user to re-submit the document if it is determined that the submitted document does not satisfy the set of requirements. This enables less friction and quicker processing times for the transaction.

However, due to the circumstances in which the digital image of the document is captured, it may be challenging to extract information associated with the document based on the digital image. For example, the digital image may include background and/or foreground objects (e.g., a table, other documents, fingers holding the document, etc.) that are not part of the document being submitted by the user. In some instances, the boundary of the document may be occluded by one or more foreground objects, making it even more challenging to identify a boundary of a document. In other instances, the boundary of the document may not be delineated with straight edges and 90 degree corners, such as due to the type of document, wear and tear of the document, or how the document is captured by the user device. Thus, there is a need for providing an improved computer system and process for detecting and processing documents within a digital image.

BRIEF DESCRIPTION OF THE FIGURES

FIGS. 5A-5H illustrate performing morphological transformations on a binary image according to an embodiment of the present disclosure;

Figure 1:
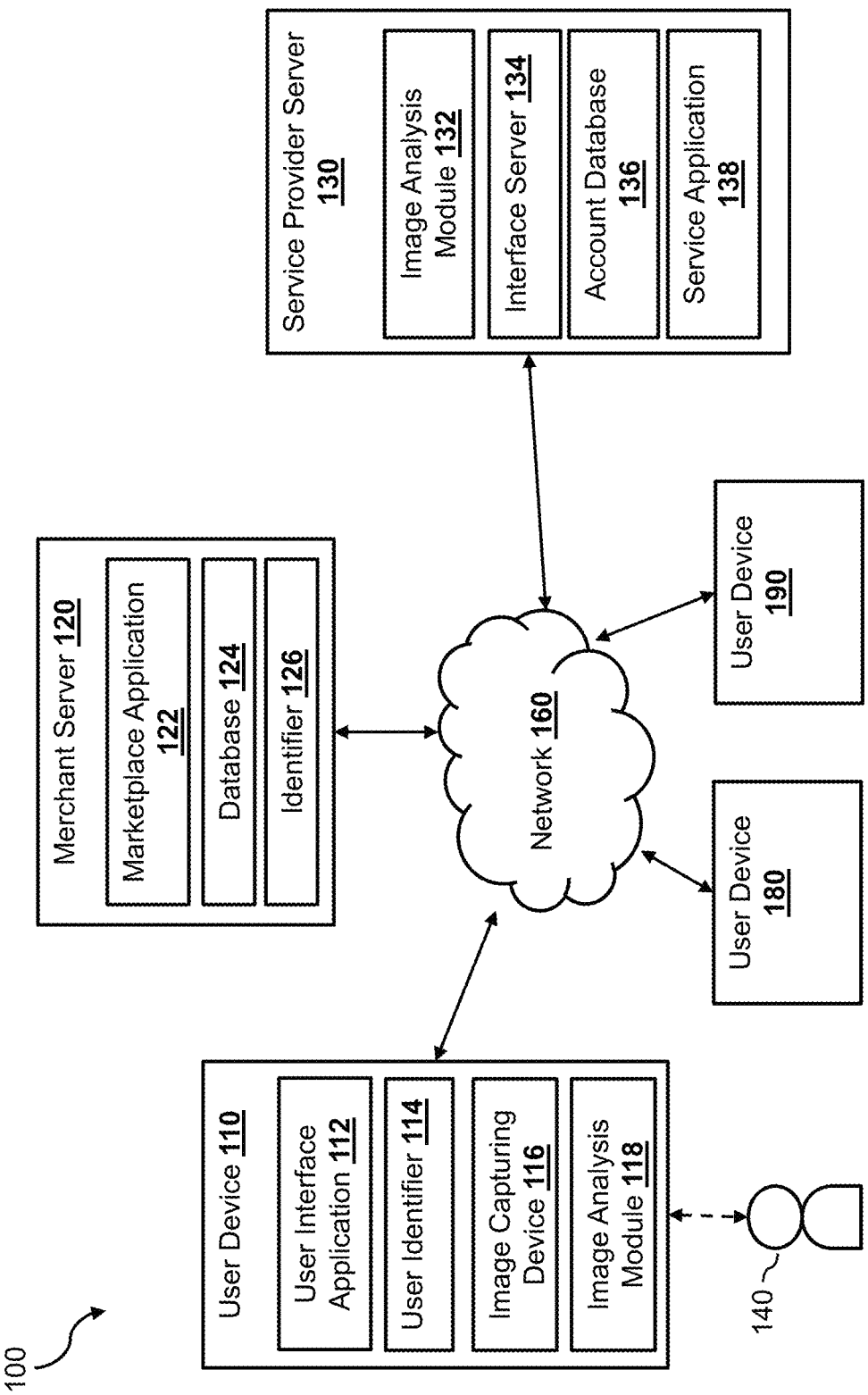
FIG. 1 is a block diagram illustrating a networked system that includes an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for detecting a boundary of a document within a digital image using kernel-based transformations and quadrilateral scoring. As discussed herein, the boundary of a document may be difficult to determine based on a user-captured image. For example, the image captured by a user may include background and foreground objects (e.g., a table, another document, body parts, etc.) that may pose challenges for detecting the boundary of the document.

Conventionally, the boundary of a document may be detected within a digital image using traditional object recognition techniques such as edge detection, contour detection, or polygon approximation and selection. A common drawback of these techniques is that they require the boundary of the document to be clear and continuous, which can be unrealistic when the user is requested to capture an image of the document in real-time during a transaction workflow, as the boundary of the document within the digital image can be broken up due to occlusion from one or more objects such as body parts (e.g., fingers of the user used to hold the document in place while capturing the image, etc.), other documents, objects close to the document, etc. that can present additional challenges in detecting the document within the image. Furthermore, blurring, irregularities in the edges or shape of the document, insignificant contrast between the document and a background in the image (e.g., the document and a background such as a table or a floor of the image share similar color hues, etc.), and/or other objects within the image (e.g., another document that appears in the background of the image, an edge of a table holding the document, an edge of a hand holding the document, etc.) may pose additional challenges in detecting the document within an image.

Thus, according to various embodiments of the disclosure, a document detection system may detect a boundary (also referred to as "borders" or "edges") of a document within a digital image using one or more kernel-based transformations, quadrilateral scoring, or a combination of both. Upon receiving a digital image (e.g., a digital image captured using a camera of a user device), the document detection system may perform a set of pre-processing to the image. For example, since the kernel-based transformations can only be applied to a binary image (e.g., each pixel in the image can only be one of two values, such as '0' and '1'), the document detection system may convert the digital image to a binary image. In some embodiments, the document detection system may convert the image into a binary image using an adaptive thresholding algorithm, where pixels that appear to be part of an edge (e.g., a border) of an object in the image (e.g., having pixel values that are darker than its surrounding pixels, such as pixels having luminance values lower than surrounding pixels by a threshold) are highlighted. Thus, after applying the adaptive thresholding algorithm on the digital image, pixels that are part of the detected edges in the digital image will be emphasized (e.g., having a value of '1') and pixels that are not part of the detected edges in the digital image will be de-emphasized (e.g., having a value of '0').

After converting the digital image into a binary image, the document detection system may perform one or more kernel-based transformations on the binary image. In some embodiments, the kernel-based transformations may include one or more morphological transformations. Assuming that the document is a rectangular shape and that it is usually captured with its borders substantially in alignment (e.g., 90% in alignment, 80% in alignment, etc.) with the frame of the image (that is, the horizontal borders of the document are substantially (e.g., 80%, 90%, etc.) parallel to the horizontal sides of the digital image, and the vertical borders of the document are substantially (e.g., 80%, 90%, etc.) parallel to the vertical sides of the digital image), the document detection system may use a horizontal kernel (also referred to as a "horizontal line kernel") and a vertical kernel (also referred to as a "vertical line kernel") for performing the morphological transformations on the image. The horizontal kernel may include a rectangular block, having its horizontal dimension larger than its vertical dimension. The vertical kernel may also include a rectangular block, having its vertical dimension larger than its horizontal dimension.

The document detection system may perform a first morphological transformation to the binary image using the horizontal kernel to generate a first transformed binary image. In some embodiments, the morphological transformation may include an erosion step and then a dilation step using the horizontal kernel. The erosion step is intended to de-emphasize any pixels that are not part of a horizontal edge (that do not conform to the horizontal kernel). In other words, the erosion step diminishes detected features (e.g., edges) in the image that do not conform with the horizontal kernel. By contrast, the dilation step is intended to emphasize one or more regions within the digital image that are part of a horizontal edge. In other words, the dilation step accentuates detected features (e.g., edges) in the image that conforms with the horizontal kernel. After the erosion and dilation steps, only horizontal edges would remain in the binary image.

The document detection system may perform a second morphological transformation to the binary image using a vertical kernel to generate a second transformed binary image. Similar to the morphological transformation using the horizontal kernel, the morphological transformation using the vertical kernel may also include an erosion step and then a dilation step. The erosion step for this second morphological transformation is intended to de-emphasize any pixels that are not part of a vertical edge (that do not conform to the vertical kernel). In other words, the erosion step diminishes detected features (e.g., edges) in the image that do not conform with the vertical kernel. By contrast, the dilation step is intended to emphasize one or more regions within the digital image that are part of a vertical edge. In other words, the dilation step accentuates detected features (e.g., edges) in the image that conforms with the vertical kernel. After the erosion and dilation steps, only vertical edges would remain in the binary image.

It is noted that both of the first and second morphological transformations are performed on the same binary image (the binary image without having any morphological transformation performed). As such, the first and second morphological transformations can be performed in any order or in parallel. The document detection system may then combine the first transformed binary image and the second transformed binary image to generate a combined transformed binary image. Based on the morphological transformations using the horizontal kernel and the vertical kernel, all of the features (e.g., highlighted pixels) that do not conform with the horizontal kernel or the vertical kernel are diminished (e.g., converting the pixel value of '1' to a pixel value of '0') and the features that conform with the horizontal kernel or the vertical kernel are accentuated (e.g., thickened, such as converting neighboring pixels from the pixel value of '0' to the pixel value of '1') in the combined transformed binary image. Compared with conventional line extraction techniques such as canny edge detection algorithms, applying the morphological transformations to the binary image using a horizontal kernel and a vertical kernel provides improved noise reduction performance (e.g., substantially more irrelevant noises, such as false edges and edges of other objects that are not part of the document, etc. are removed).

In some embodiments, the document detection system may also apply a probabilistic Hough line transformation on the resulting binary image (e.g., the combined transformed binary image). The probabilistic Hough line transformation may be used to identify curves (e.g., a part of a circle or an ellipse). Since the borders of a document should include only straight lines, lines that are part of a curve (e.g., not straight within a threshold) are likely part of a border of a different object (e.g., a finger, a face, a background object, etc.) within the image, instead of a border of the document. As such, the document detection system may use the probabilistic Hough line transformation to identify any vertical and horizontal lines in the binary image that are not substantially straight (e.g., based on a parameter applied to the Hough line transformation), and remove those lines that are not substantially straight (e.g., not straight within a threshold) from the binary image.

To further remove irrelevant lines in the binary image (e.g., lines that are likely not part of the borders of the document), the document detection system may apply one or more heuristics to the binary image. For example, since the document is likely captured in the middle of the image and cover a majority of the image (not skewed toward one side), any detected lines that cross a middle portion of the image are likely not a border of the document. Thus, the document detection system may remove, from the binary image, any lines that cross the middle portion of the image. In some embodiments, the document detection system may define the middle portion of the image as an area (e.g., a rectangle, a circle, or any shape) that covers the center of the image. For example, the middle portion may be defined as a circle having a center at the center of the image and with a predetermined radius (e.g., a predetermined number of pixels, etc.). In another example, the middle portion may be defined as a rectangle having a center at the center of the image. The rectangle may have a length that is a portion of the length of the image (e.g., one-third, one-fourth, etc.), and a width that is a portion of the width of the image (e.g., one-third, one-fourth, etc.).

Since the document should be located in the middle of the image, and should be entirely captured in the image, lines that abut any side of the image are likely not associated with the borders of the document (the object associated with the line is likely partially out of the image frame). Thus, the document detection system may also remove any lines that abut the sides of the image.

Lines that are not horizontal or vertical within a predetermined threshold (e.g., 90% from being horizontal, 90% from being vertical, etc.) may also be removed. Furthermore, lines that are substantially colinear with each other (e.g., within a threshold of being in parallel with each other and in proximity with each other within a threshold) are merged, such that broken up borders (e.g., borders that are broken up by a foreground object such as a portion of a finger holding the document, etc.) can be connected to form a continuous line.

After performing the morphological transformations, the Hough line transformation, and additional line processing to the binary image, only substantially vertical and horizontal lines that are likely to be borders of a document remain in the binary image. The document detection system may then determine multiple quadrilateral candidates based on the remaining lines in the binary image. Each quadrilateral candidate, being a quadrilateral (that is, a four-sided shape) constructed using two horizontal lines and two vertical lines from the binary image, is a candidate for the boundary of the document. To generate the quadrilateral candidates, the document detection system of some embodiments may first extend each of the lines in the binary image such that each line abuts two sides (e.g., two horizontal sides or two vertical sides) of the binary image. After extending each of the lines in the binary image, the extended lines would form multiple quadrilaterals based on different combinations of two horizontal lines and two vertical lines that intersect with each other. The document detection system may determine a score for each quadrilateral candidate based on how well the lines (before they were extended) corresponding to the quadrilateral candidate fit the perimeter of the quadrilateral. The document detection system may select, from the quadrilateral candidates, one quadrilateral having the best score as the boundary of the document.

In some embodiments, if the document detection system determines that two or more quadrilateral candidates have an identical best score, the document detection system may select the quadrilateral having the largest size as the boundary of the document.

FIG. 1 illustrates a networked system 100, within which the document detection system may be implemented according to one embodiment of the disclosure. Note that the present techniques may be applied in many different computing and technological environments, however, and are not limited to those shown in the figures. The networked system 100 includes a service provider server 130, a merchant server 120, and user devices 110, 180 and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120 and/or the service provider server 130 over the network 160. For example, the user 140 may use the user device 110 to conduct an online transaction with the merchant server 120 via websites hosted by, or mobile applications associated with, the merchant server 120. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130, and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

In some embodiments, the user 140 of the user device 110 may use the user interface application 112 to initiate one or more transactions (e.g., a login transaction, a data access transaction, a data update transaction, an onboarding transaction for creating a new user account, a payment transaction, etc.) with the merchant server 120 and/or the service provider server 130. Through a user interface provided on the user interface application 112, the user 140 may input and transmit data associated with the transactions to the merchant server 120 and/or the service provider 130. For example, the user 140 may be required to proceed through a transaction workflow that includes multiple interfaces (e.g., multiple webpages). The user 140 may provide input and data as required by the transaction workflow to initiate the transaction with the merchant server 120 and/or the service provider server 130.

The user device 110 may include an image capturing device 116, such as a camera, for capturing digital images of objects within a camera view of the image capturing device 116. For example, the user device 110 may use the image capturing device 116 to capture digital images of documents to be transmitted to the service provider server 130, as part of a transaction workflow. In some embodiments, the user device 110 may include an image analysis module 118 configured to perform at least some of the document detection functionalities of the document detection system as described herein. The image analysis module 118 may be configured to identify a document within a digital image captured by detecting four borders of the document using techniques disclosed herein. For example, the user 140 may use the image capturing device 116 to capture a stream of images (e.g., a video), and the image analysis module 118 may be configured to continuously identify documents within the images, and may indicate on the user device 110 when a document is identified based on the detected edges of the document. In some embodiments, the image analysis module 118 may further analyze data associated with the document (e.g., a layout, a distinctive feature such as a human face or a location of a human face within the document, etc.) to determine whether the document satisfies a set of requirements (e.g., whether the document identified within the image corresponds to a required document type). The image analysis module 118 may present a notification on the user device 110 indicating that the document captured by the user 140 does not satisfy the set of requirements and prompting the user to re-capture the document.

The user device 110, in one embodiment, may include at least one identifier 114, which may be implemented, for example, as operating system registry entries, cookies associated with the user interface application 112 and/or the wallet application 116, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user 140 with a particular user account (e.g., and a particular profile) maintained by the service provider server 130.

Each of the user devices 180 and 190 may include similar hardware and software components as the user device 110 to enable their respective users to interact with the merchant server 120 and the service provider server 130 through the user devices 180 and 190. For example, the users of the user devices 180, and 190 may also use the respective devices to conduct electronic transactions through different user accounts of the merchant server 120 and/or the service provider server 130. Furthermore, the users of the user devices 180 and 190 may also use the respective image capturing devices to capture images of documents for transmitting to the merchant server 120 and/or the service provider server 130 as part of a transaction workflow. In some embodiments, each of the user devices 180 and 190 may also include a respective image analysis module for performing image analysis functionalities similar to the image analysis module 118.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for viewing, accessing, and/or purchasing, and process payments for the purchases. As shown, the merchant server 120 may include a merchant database 124 for identifying available items, which may be made available to the user devices 110, 180, and 190 for viewing and purchase by the user.

The merchant server 120, in one embodiment, may include a marketplace application or server 122, which may be configured to provide information (e.g., displayable content) over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for access and/or purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user device 110 and the service provider server 130 via the network 160.

The service provider server 130, in one embodiment, may be maintained by a transaction processing entity or an online service provider, which may provide processing for electronic transactions between the users of the user devices 110, 180, and 190, and one or more merchants or other types of payees. As such, the service provider server 130 may include a service application 138, which may be adapted to interact with the user devices 110, 180, and 190, and/or the merchant server 120 over the network 160 to facilitate the searching, selection, purchase, payment of items, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities (e.g., between two users, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various services provided by the service provider server 130. The interface server 134 may also include other electronic pages associated with the different services (e.g., electronic transaction services, etc.) offered by the service provider server 130. As a result, a user (e.g., the user 140, users of the user devices 180 and 190, or a merchant associated with the merchant server 120, etc.) may access a user account associated with the user and access various services offered by the service provider server 130, by generating HTTP requests directed at the service provider server 130. In some embodiments, the fragment module integration framework may be implemented within or in association with the interface server 134.

The service provider server 130, in one embodiment, may be configured to maintain one or more user accounts and merchant accounts in an account database 136, each of which may be associated with a profile and may include account information associated with one or more individual users (e.g., the user 140 associated with user device 110, users associated with the user devices 180 and 190) and merchants. In one implementation, a user may have credentials to authenticate or verify identity with the service provider server 130. Thus, the service provider server may store the credentials of the users in corresponding records of the account database 136 associated with the user accounts.

In various embodiments, the service provider server 130 includes an image analysis module 132 that implements at least part of the document detection system as discussed herein. As discussed herein, through interactions with the interface server 134, the user 140 may initiate transactions with the service provider server 130. For example, the user 140 may initiate an onboarding transaction for creating a user account with the service provider server 130, may initiate a data update transaction for updating data associated with the user 140 stored on the account database 136, a payment transaction for purchasing an item from a merchant associated with the merchant server 120, etc. Through the interface server 134, the service provider server 130 may provide a transaction workflow for the requested transaction. The transaction workflow may include a series of interfaces that the user 140 is required to progress through by providing the necessary data associated with the transaction, such as a name, an age, a payment amount, etc. For certain transactions, the service provider server 130 may require additional document(s) for processing the transaction, such as an identification document (e.g., a driver's license, a passport, etc.), a payment card (e.g., a credit card, etc.), a legal contract, etc. In order to submit such a document, the user interface provided by the interface server 134 may enable the user 140 to transmit an image captured by the image capturing device 116 of the user device 110 to the service provider server 130. Thus, processing of the document captured by the user device 110 (or user device 180 or user device 190) may be performed by the user device or the service provider server 130.

In some embodiments, the image analysis module 132 may perform document detection functionalities of the document detection system as described herein. For example, upon receiving the image from the user device 110, the image analysis module 132 may identifying a document within the image based on detecting the borders of the document using techniques as disclosed herein. When a document is identified within the image, the image analysis module 132 may transmit a notification to the user device 110, indicating that a document has been received. In some embodiments, similar to the image analysis module 118, the image analysis module 132 may further analyze data associated with the document (e.g., a layout, a distinctive feature such as a human face or a location of a human face within the document, etc.) identified in the image to determine whether the document satisfies a set of requirements (e.g., whether the document identified within the image corresponds to a required document type). The image analysis module 132 may present a notification on the user device 110 indicating that the document captured by the user 140 does not satisfy the set of requirements and prompting the user to re-submit another image of a document that satisfies the set of requirements.

Figure 2:
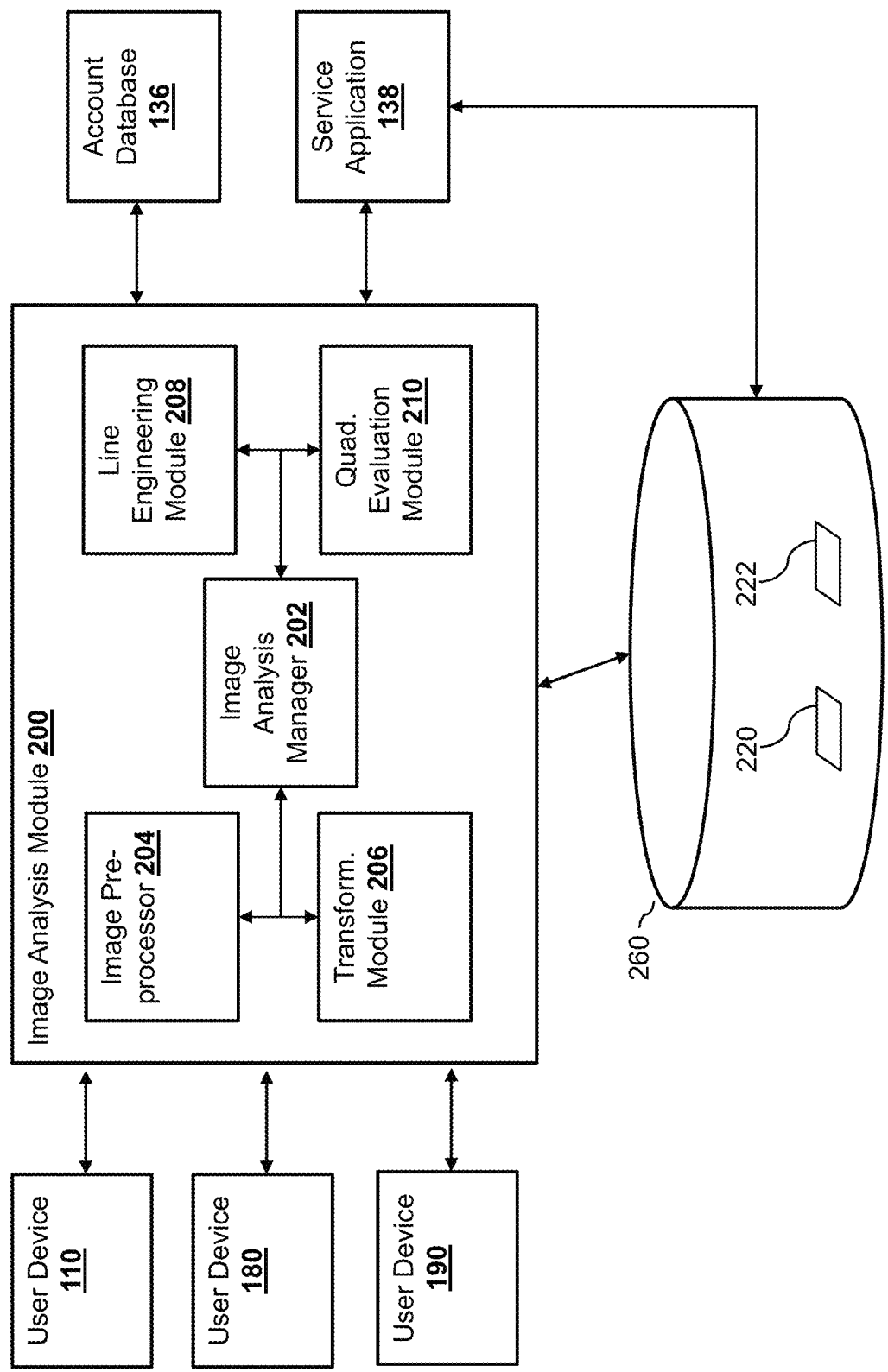
FIG. 2 is a block diagram illustrating an image analysis module according to an embodiment of the present disclosure.

FIG. 2 illustrates a block diagram of an image analysis module 200 according to an embodiment of the disclosure. The image analysis module 200 may be used to implement the image analysis module 118 and/or the image analysis module 132. The image analysis module 200 includes an image analysis manager 202, an image pre-processor 204, a transformation module 206, a line engineering module 208, and a quadrilateral evaluation module 210. The image analysis module 200 may receive an image from a user device (e.g., the user device 110, the user device 180, and/or the user device 190). When the image analysis module 200 is implemented as the image analysis module 132 of the service provider server 130, the image may be received through the interface server 134. For example, the user 140 may transmit the image to the service provider server 130 via a user interface provided by the interface server 134 and presented on the user device 110 via the user interface application 112. When the image analysis module 200 is implemented as the image analysis module 118 of the user device 110, the image analysis module 118 may monitor images being captured by the image capturing device 116, and may receive an image as the image is being captured by the image capturing device 116. In some embodiments, the image capturing device 116 may be configured to continuously capturing a sequence of images (e.g., a video). As such, the image analysis module 118 may be configured to iteratively perform the document detection functionalities on images captured by the image capturing device 116.

Upon receiving the image, the image pre-processor 204 may perform one or more pre-processing operations on the image and convert the image into a binary image, where potential edges of objects (pixels that are darker than the surrounding pixels) are highlighted. The transformation module 206 may perform one or more kernel-based transformations on the binary image. For example, the transformation module 206 may perform a first morphological transformation on the binary image based on a horizontal kernel and a second morphological transformation on the binary image based on a vertical kernel. The morphological transformation suppresses edges that do not conform to the horizontal or the vertical kernel (in other words, edges that are not substantially horizontal or vertical), and accentuates edges that conform to the horizontal or the vertical kernel (in other words, edges that are substantially horizontal or vertical). The line engineering module 208 may perform additional heuristics on the transformed image to remove any lines that are not likely to be borders of a document. Based on the remaining lines in the binary image, the quadrilateral evaluation module 210 may determine multiple quadrilateral candidates. The quadrilateral evaluation module 210 may evaluate each quadrilateral candidate based on how well the lines used to construct the quadrilateral candidate fit in the quadrilateral candidate. The image analysis manager 202 may select the quadrilateral candidate having the best score (e.g., best evaluation) as the boundary of the document.

Once the boundary of the document is determined, the image analysis module 200 may analyze the data associated with the document. For example, the image analysis module 200 may extract information from the document based on the boundary of the document, such as a layout of the document, or a position of a feature (e.g., a human face, a logo, etc.) within the document. The image analysis module 200 may determine, based on the information associated with the document, whether the document satisfies a set of requirements (e.g., whether the document corresponds to the type of document requested by the service provider server 130).

In the example where the image analysis module 200 is implemented as the image analysis module 118 of the user device 110, the image analysis module 200 may transmit the image from the user device 110 to the service provider server 130 via the user interface application 112 if it is determined that the document satisfies the set of requirements. On the other hand, if the image analysis module 200 determines that the document does not satisfy the set of requirements, the image analysis module 200 may present an alert on the user device 110, and may prompt the user 140 to capture another document that would satisfy the set of requirements or re-capture the same document using a different background, etc.

In the other example where the image analysis module 200 is implemented as the image analysis module 132 of the service provider server 130, if it is determined that the document satisfies the set of requirements, the image analysis module 200 may store the image in the account database 136. In some embodiments, the image analysis module 200 may extract data (e.g., information recorded in the document) associated with the document and store the extracted data (e.g., data 220, data 222, etc.) in the account database 136 or a data storage 260. The image analysis module 200 may also instruct the service application 138 to process a transaction (e.g., the transaction associated with the transaction workflow that requested the document) based on the information from the image. On the other hand, if the image analysis module 200 determines that the document does not satisfy the set of requirements, the image analysis module 200 may present an alert on the user device 110, and may prompt the user 140 to capture a document that would satisfy the set of requirements or re-capture the same document using a different background, etc.

Figure 3A:
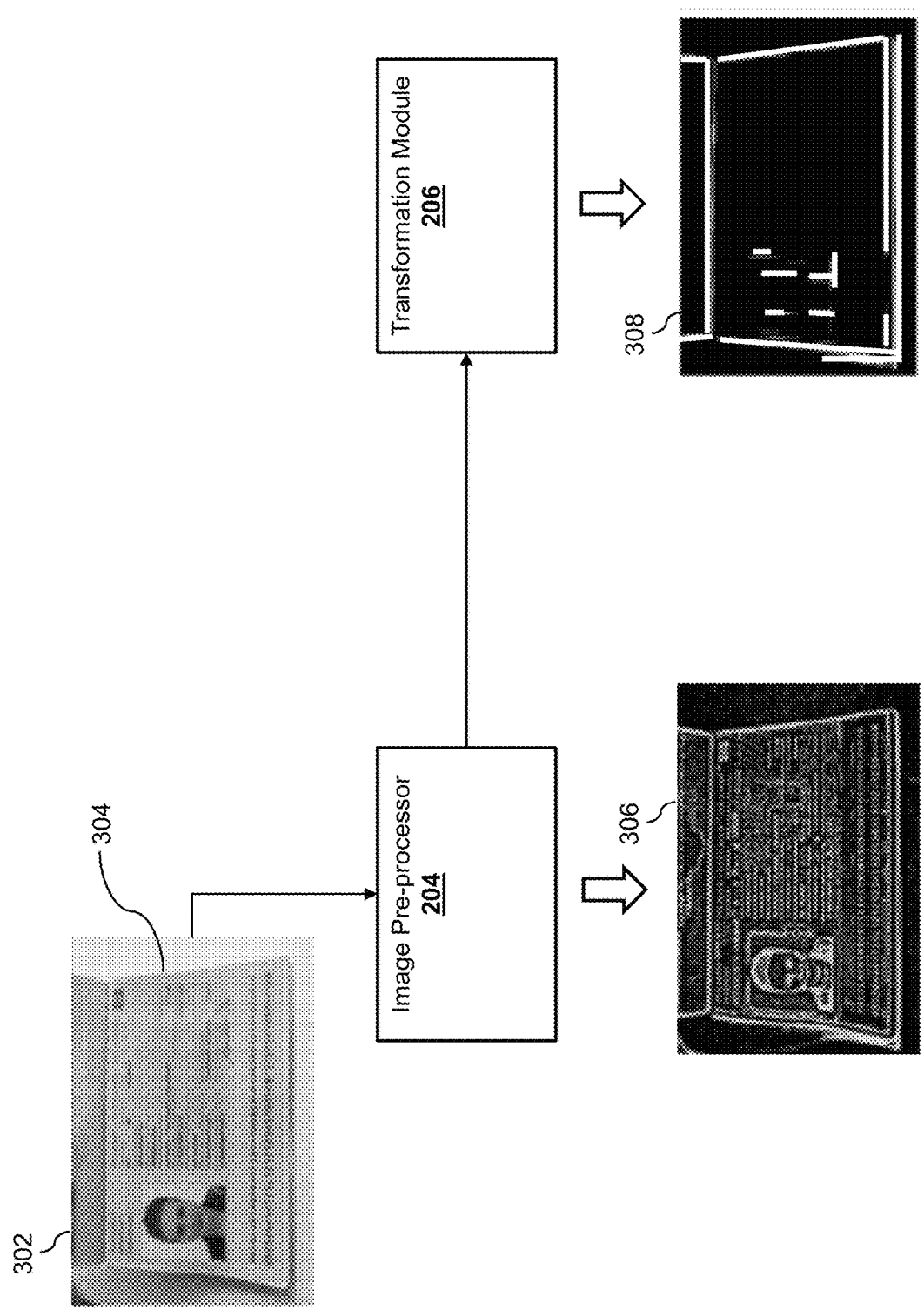
FIGS. 3A-3D illustrate an example of detecting a document within an image according to an embodiment of the present disclosure.

FIGS. 3A-3D illustrate an example of detecting a document within an image using the techniques disclosed herein according to some embodiments of the disclosure. In this example and as shown in FIG. 3A, the image processing module 200 may receive a digital image 302. The digital image 302 may be an image captured by an image capturing device 116 of the user device 110. The digital image 302 may include an identification document 304 that is requested by the service provider server 130. For example, the service provider server 130 requests for an identification document during a transaction workflow initiated by the user 140. The user 140 may use the image capturing device 116 to capture the digital image 302 of the identification document 304. In this example, the identification document 304 may include an identification page of a passport.

In some embodiments, if the digital image 302 is a multi-channel image (e.g., an RGB color image, etc.), the image pre-processor 204 may first convert the digital image 302 from multiple channel into a single channel (e.g., converting an RGB image to a grayscale image, etc.), where the single channel represents luminance values of the pixels within the digital image 302. The image pre-processor 204 may then convert the digital image 302 into a binary image 306 (e.g., each pixel in the image 206 can only be one of two values, such as '0' and '1'). In some embodiments, the image pre-processor 204 may convert the digital image 302 into the binary image 306 using an adaptive thresholding algorithm, where pixels that appear to be part of an edge (e.g., a border) of an object in the image (e.g., having pixel values that are darker than its surrounding pixels) are highlighted. Thus, after applying the adaptive thresholding algorithm on the digital image 302, pixels that are part of the detected edges in the digital image 302 will be emphasized (e.g., having a value of '1'), as shown as white, and pixels that are not part of the detected edges in the digital image 302 will be de-emphasized (e.g., having a value of '0'), as shown as black.

After converting the digital image 302 into the binary image 306, the transformation module 206 may perform one or more kernel-based transformations on the binary image 306. In some embodiments, the kernel-based transformations may include one or more morphological transformations. Assuming that the identification document 304 (e.g., the identification page on the passport, a driver's license, etc.) is a rectangular shape and that it is usually captured with its borders substantially in alignment (e.g., 90% in alignment, 80% in alignment, etc.) with the frame of the digital image 302 (that is, the horizontal borders of the document 304 is substantially (e.g., 80%, 90%, etc.) in parallel to the horizontal sides of the digital image 302, and the vertical borders of the identification document 304 are substantially (e.g., 80%, 90%, etc.) in parallel to the vertical sides of the digital image), the transformation module 206 may use a horizontal kernel and a vertical kernel for performing the morphological transformations on the binary image 306. The horizontal kernel may include a rectangular block of pixels, having its horizontal dimension larger than its vertical dimension (e.g., a 3-pixel wide and 1-pixel long block). The vertical kernel may also include a rectangular block of pixels, having its vertical dimension larger than its horizontal dimension (e.g., a 1-pixel wide and 3-pixel long block). The process of performing the morphological transformations on an image using a horizontal kernel and a vertical kernel will be discussed in detail below by reference to FIGS. 5A-5H. The result of performing a morphological transformation using a horizontal kernel and a morphological transformation using a vertical kernel on the binary image 306 is that the features (e.g., highlighted pixels) that do not conform with the horizontal kernel or the vertical kernel are diminished (e.g., converting the pixel value of '1' to a pixel value of '0'), and the features that conform with the horizontal kernel or the vertical kernel are accentuated (e.g., thickened, such as converting neighboring pixels from the pixel value of '0' to the pixel value of '1'). FIG. 3A illustrates a transformed binary image 308 after performing a combination of a morphological transformation using a horizontal kernel and a morphological transformation using a vertical kernel on the binary image 306. As shown, the transformed binary image 308 only includes features from the binary image 306 that are lines within a threshold of a horizontal direction (substantially horizontal) and lines within a threshold of a vertical direction (substantially vertical).

After applying the morphological transformations to the binary image 306 to generate the transformed binary image 308, the line engineering module 208 may perform one or more line processing operations on the transformed binary image 308 to eliminate any lines that are likely not associated with a border of the identification document 304. For example, the line engineering module 208 may use a probabilistic Hough line transformation on the binary image 308. The probabilistic Hough line transformation may be used to identify curves (e.g., a part of a circle or an ellipse). Since the borders of a document should include only straight lines, lines that are part of a curve (e.g., not straight within a threshold) are likely part of a border of a different object (e.g., a finger, a face, a background object, etc.) within the digital image 302, instead of a border of the document. As such, the line engineering module 208 may use the probabilistic Hough line transformation to identify any vertical and horizontal lines in the binary image 308 that are not straight within a threshold (e.g., based on a parameter applied to the Hough line transformation), and remove those lines that are determined not to be straight based on the parameter from the binary image 308.

Figure 3B:
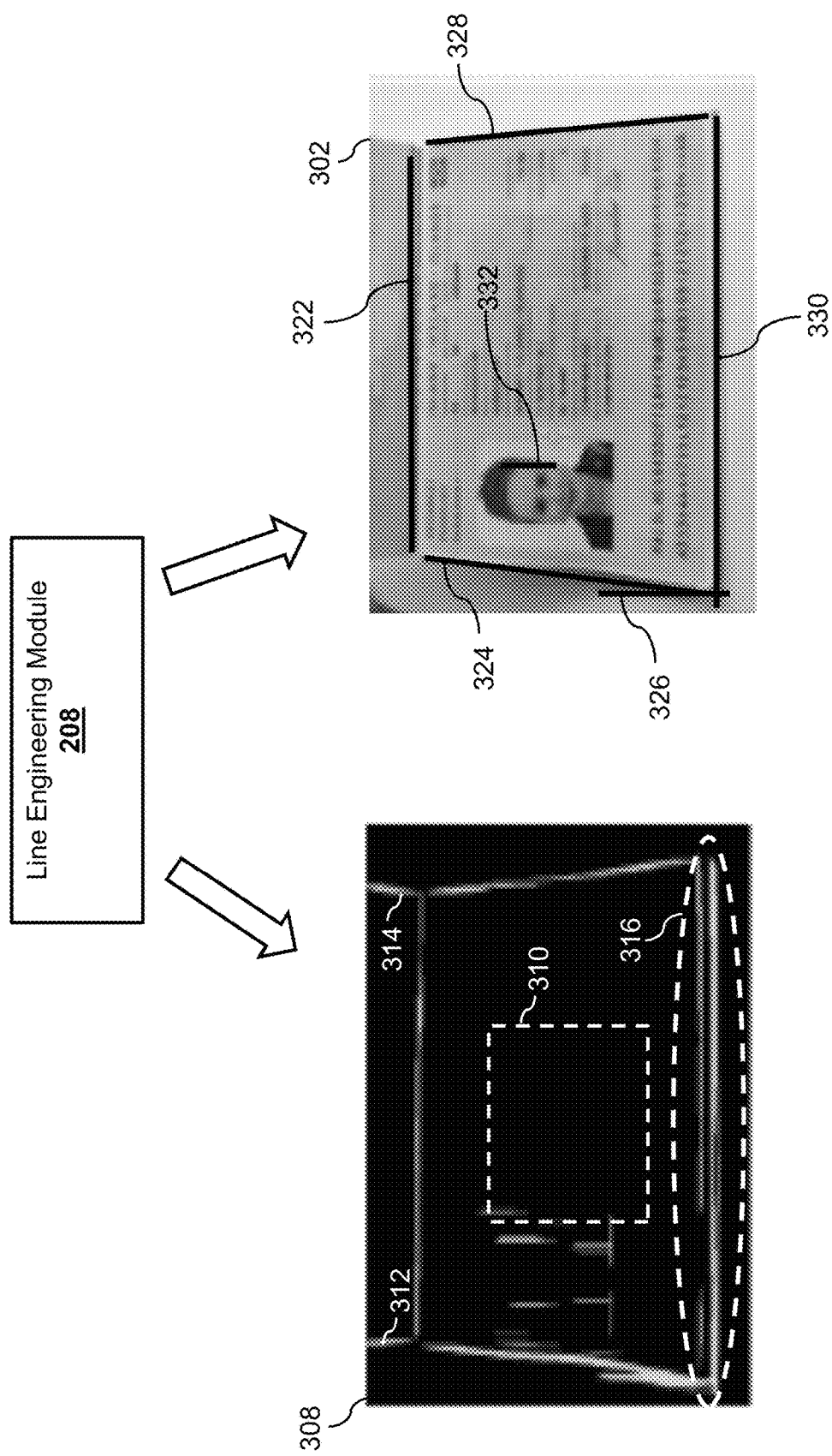

To further remove irrelevant lines in the binary image 308 (e.g., lines that are likely not part of the borders of the document), the line engineering module 208 may apply one or more heuristic to the binary image 308. For example, since the identification document 304 is likely captured in the middle of the digital image 302 and cover a majority of the digital image 302 (not skewed toward one side), any detected lines that cross a middle portion of the image are likely not a border of the identification document 304. Thus, the line engineering module 208 may remove, from the binary image, any lines that cross the middle portion of the image. As shown in FIG. 3B, the line engineering module 208 may determine a middle portion 310 of the binary image 308 as a rectangle having a center overlapping the center of the binary image 308. In some embodiments, the middle portion 310 may have a length that is in proportion to (e.g., one-third, one-fourth) the length of the binary image 308, and may have a width that is in proportion to (e.g., one-third, one-fourth) the width of the binary image 308. The line engineering module 208 may remove any lines that cross the middle portion 310 of the binary image 308.

Since the identification document 304 should be located in the middle of the image, and should be entirely captured in the image, lines that abut any side of the binary image 308 are likely not associated with the borders of the identification document 304 (the object associated with the line is likely partially out of the image frame). Thus, the line engineering module 208 may also remove any lines that abut any sides of the image. In this example, the line engineering module 208 may determine that the lines 312 and 314 abut the top side of the binary image 308, and may remove the lines 312 and 314 from the binary image 308. Lines that are not horizontal or vertical within a predetermined threshold (e.g., 90% from being horizontal, 90% from being vertical, etc.) may also be removed by the line engineering module 208.

Furthermore, lines that are substantially colinear with each other (e.g., within a threshold of being in parallel with each other and in proximity with each other within a threshold) are merged, such that broken up borders (e.g., borders that are broken up by a foreground object such as a portion of a finger holding the document, etc.) can be connected to form a continuous line. In this example, the line engineering module 208 may determine that the lines within the area 316 are colinear (e.g., the lines are within a threshold of being in parallel with each other and close to each other within a threshold), and thus may merge the lines within the area 316. After eliminating certain irrelevant lines and merging lines that are determined to be associated with single edges, the binary image 308 may include only lines that have a high likelihood to be edges of the identification document 304 within the digital image 302. After performing the morphological transformations, the Hough line transformation, and additional line processing to the binary image 308, only substantially vertical and horizontal lines that are likely to be borders of the identification document 304 remain in the binary image 308. In FIG. 3B, the lines 322-330 remaining in the binary image 308 are superimposed onto the original digital image 302 to show the relative positions of the remaining lines 322-330 on the digital image 302.

Figure 3C:
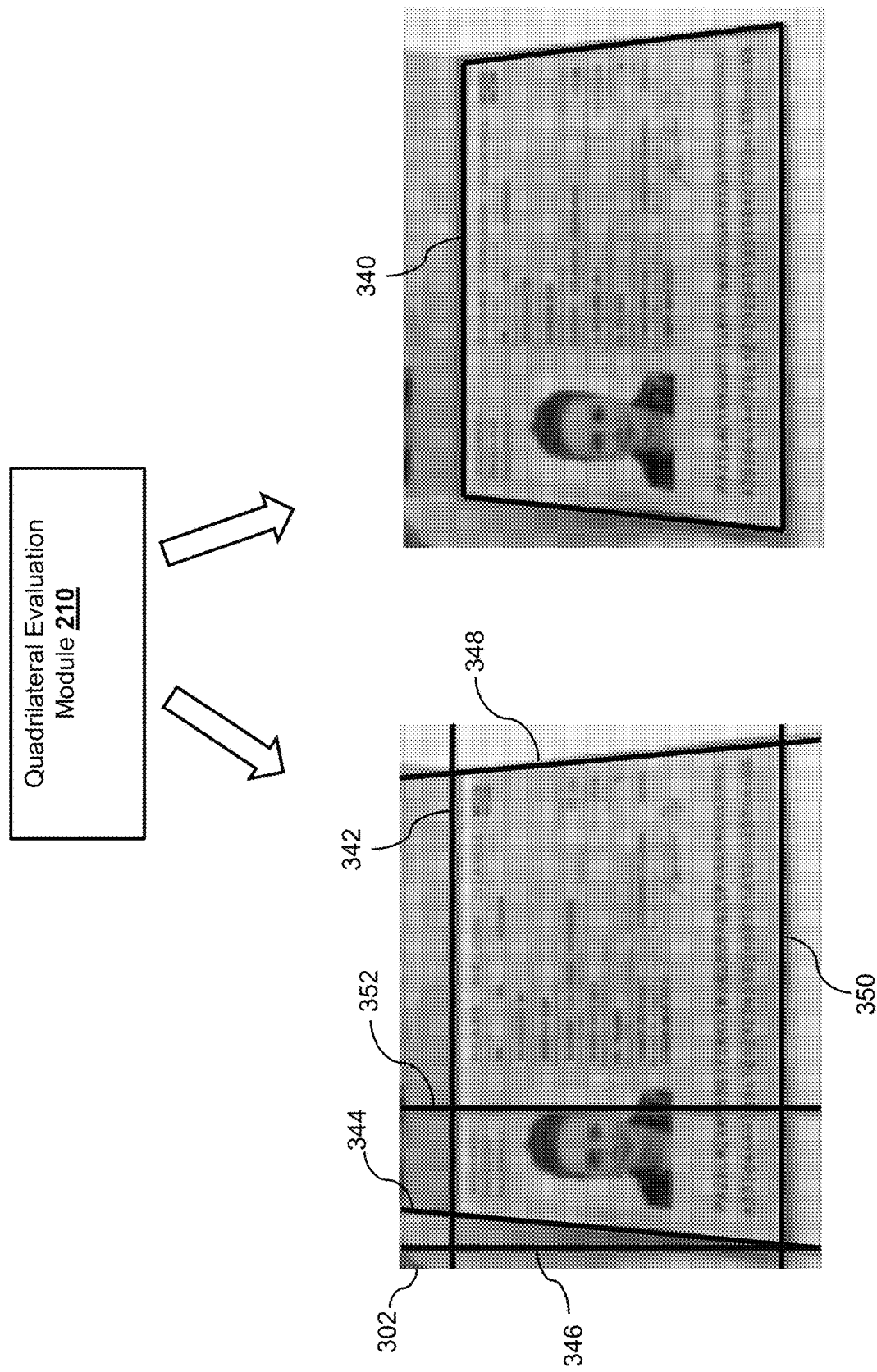

The quadrilateral evaluation module 210 may then determine multiple quadrilateral candidates based on the remaining lines 322-330 in the binary image 308. Each quadrilateral candidate is a four-sided shape polygon constructed using two horizontal lines and two vertical lines from the remaining lines 322-330 of the binary image 308. The quadrilateral evaluation module 210 may determine that each quadrilateral candidate is a candidate for the boundary of the identification document 304. To generate the quadrilateral candidates, the quadrilateral evaluation module 210 of some embodiments may first extend each of the lines 322-330 in the binary image 308 such that each line abuts two sides (e.g., two horizontal sides or two vertical sides) of the binary image 308. For example, the quadrilateral evaluation module 210 may extend the line 322 to the left side and the right side of the binary image 308 to form an extended line 342. Similarly, the quadrilateral evaluation module 210 may also extend the line 330 to the left side and the right side of the binary image 308 to form an extended line.350 The quadrilateral evaluation module 210 may also extend the lines 326, 324, 332, and 328 to the top side and the bottom side of the binary image 308 to form extended lines 346, 344, 352, and 348, respectively. FIG. 3C illustrates the extended lines 342-350 superimposed on the original digital image 302.

The quadrilateral evaluation module 210 may then determine multiple quadrilateral candidates based on the extended lines 342-350. In some embodiments, the quadrilateral evaluation module 210 may determine quadrilateral candidates by selecting different combinations of two horizontal lines and two vertical lines that intersect with each other. For example, the quadrilateral evaluation module 210 may determine a quadrilateral candidate based on a quadrilateral constructed using portions the extended lines 342, 350, 346, and 348. Specifically, the quadrilateral candidate consists of a portion of the extended line 342 from the intersection with the extended line 346 to the intersection with the extended line 348, a portion of the extended line 350 from the intersection with the extended line 346 to the intersection with the extended line 348, a portion of the extended line 346 from the intersection with the extended line 342 to the intersection with the extended line 350, and a portion of the extended line 348 from the intersection with the extended line 342 to the intersection with the extended line 350.

The quadrilateral evaluation module 210 may determine another quadrilateral candidate based on another quadrilateral constructed using portions of the extended lines 342, 350, 344, and 348. Specifically, the quadrilateral candidate consists of a portion of the extended line 342 from the intersection with the extended line 344 to the intersection with the extended line 348, a portion of the extended line 350 from the intersection with the extended line 344 to the intersection with the extended line 348, a portion of the extended line 344 from the intersection with the extended line 342 to the intersection with the extended line 350, and a portion of the extended line 348 from the intersection with the extended line 342 to the intersection with the extended line 350. The quadrilateral evaluation module 210 may determine as many quadrilateral candidates as desired based on the number of combinations of two horizontal lines and two vertical lines from the extended lines 342-350.

Figure 3D:
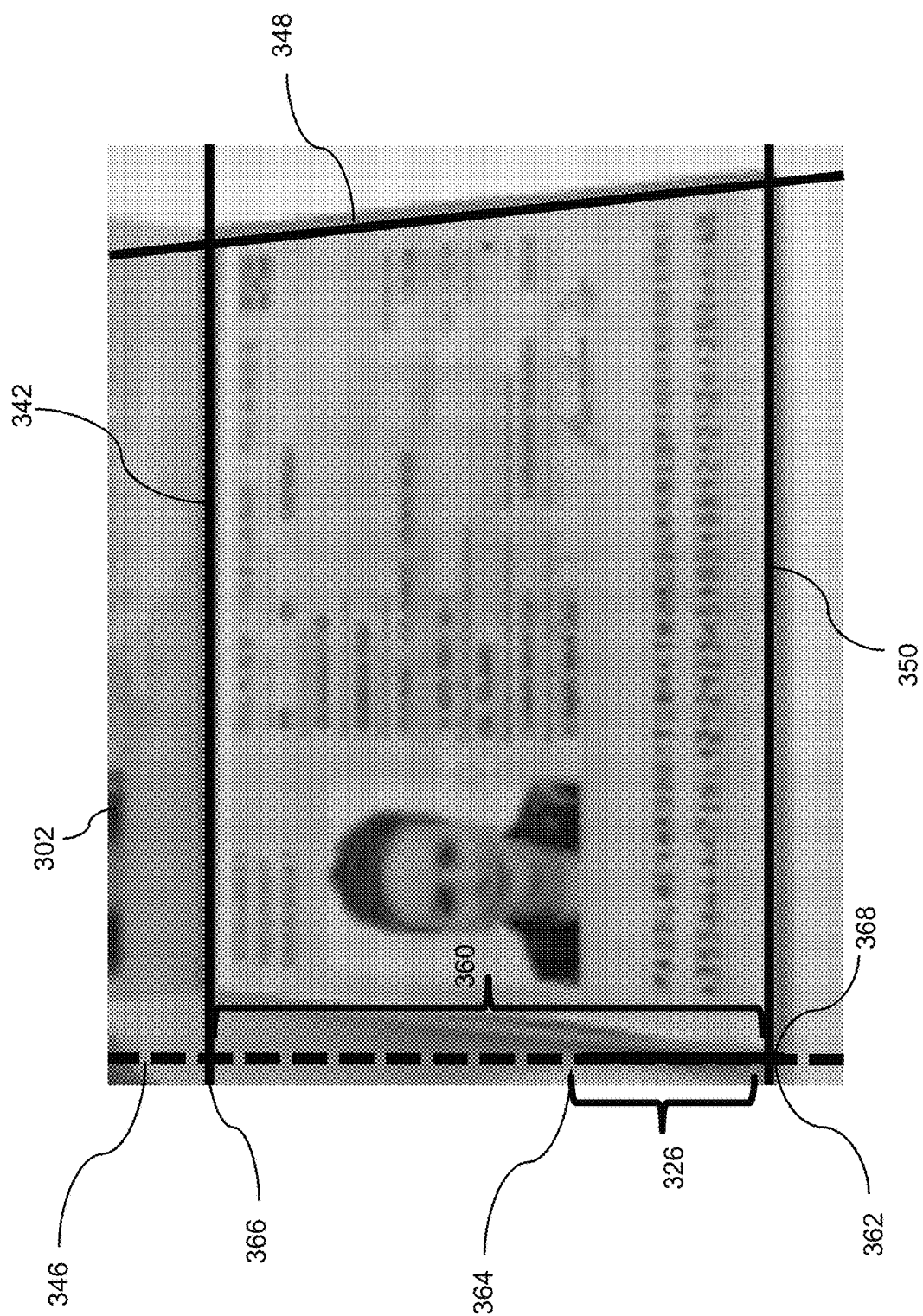

The quadrilateral evaluation module 210 may then determine a score for each quadrilateral candidate based on how well the original lines, that correspond to the extended lines used to construct the quadrilateral candidate, fit in the quadrilateral candidate. For example, to determine a score for the quadrilateral candidate constructed using the extended lines 342, 350, 346, and 348, the quadrilateral evaluation module 210 may evaluate how well the original lines 322, 330, 326, and 328 fit in the quadrilateral candidate. FIG. 3D illustrates the quadrilateral candidate constructed using the extended lines 342, 350, 346, and 348. The quadrilateral evaluation module 210 may evaluate how well each of the original lines 322, 330, 326, and 328 fit in the quadrilateral candidate. For example, the quadrilateral evaluation module 210 may first evaluate the original line 326, which corresponds to the extended line 346 used to construct the left edge of the quadrilateral. The left edge of the quadrilateral includes only a portion 360 of the extended line 346. Thus, the quadrilateral evaluation module 210 may determine a score for the extended line 346 based on how well the original line 326 fits in the portion 360 of the extended line 346. In some embodiments, the quadrilateral evaluation module 210 may use the following equation to determine a score for a line:

$$\text{Score of line} = \text{Min}(\text{distance}(AC) + \text{distance}(BD), \text{distance}(AD) + \text{distance}(BC)) \quad (1)$$

Where A and B are endpoints of the original line and C and D are end points of the portion of the extended line used to construct the quadrilateral.

The score of the line indicates how much difference is between the original line and the corresponding edge of the quadrilateral candidate. The smaller the score, the better the original line fits the edge of the quadrilateral candidate. Applying Equation (1) to the extended line 346, where A is one end point 364 of the original line 326, B is the other end point 362 of the original line 326, C is the intersection 366 between the extended line 346 and the extended line 342, and D is another intersection 368 between the extended line 346 and the extended line 350. Thus, the score for the line 326 is the minimum of (i) the sum of the distance between end point 362 and the intersection 366 and the distance between the endpoint 362 and the intersection 368 and (ii) the sum of the distance between the endpoint 364 and the intersection 368 and the distance between the endpoint 362 and the intersection 366. In this example, the score of the extended line 346 equals to the distance between the endpoint 364 and the intersection 366, which is relatively large.

On the other hand, since the original line 328 is almost the same as the portion of the extended line 348 used to construct the quadrilateral, the score of the extended line 348 would be very small (e.g., close to 0). The quadrilateral evaluation module 210 may then determine the score for the quadrilateral using the following equation:

$$\text{Score of quadrilateral} = \frac{(\text{Sum of the scores of all lines})}{(\text{Perimeters of the quadrilateral})} \quad (2)$$

The quadrilateral evaluation module 210 may use this technique to determine the score for all of the quadrilateral candidates and may select, from the quadrilateral candidates, one quadrilateral having the best score (e.g., the lowest score) as the boundary of the document 304. In some embodiments, if the quadrilateral evaluation module 210 determines that two or more quadrilateral candidates have an identical best (e.g., lowest) score, the quadrilateral evaluation module 210 may select the quadrilateral having the largest size. Referring back to FIG. 3C, in this example, the quadrilateral candidate 340 constructed using portions of the extended lines 342, 340, 344, and 348 would have the best (e.g., lowest) score, and would be selected by the quadrilateral evaluation module 210 as the boundary for the identification document 304.

Figure 4A:
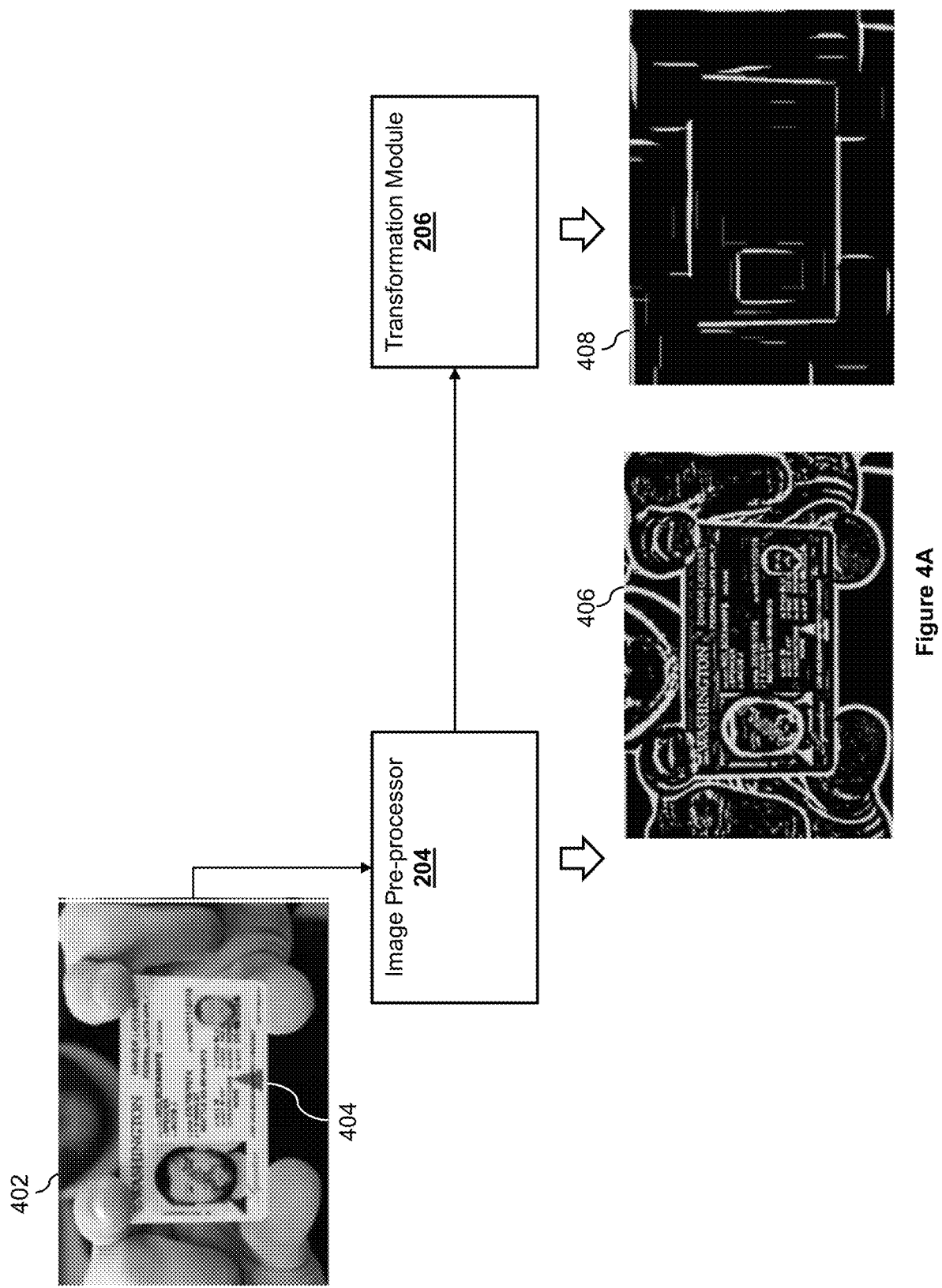
FIGS. 4A-4C illustrate another example of detecting a document within an image according to an embodiment of the present disclosure.
Figure 4B:
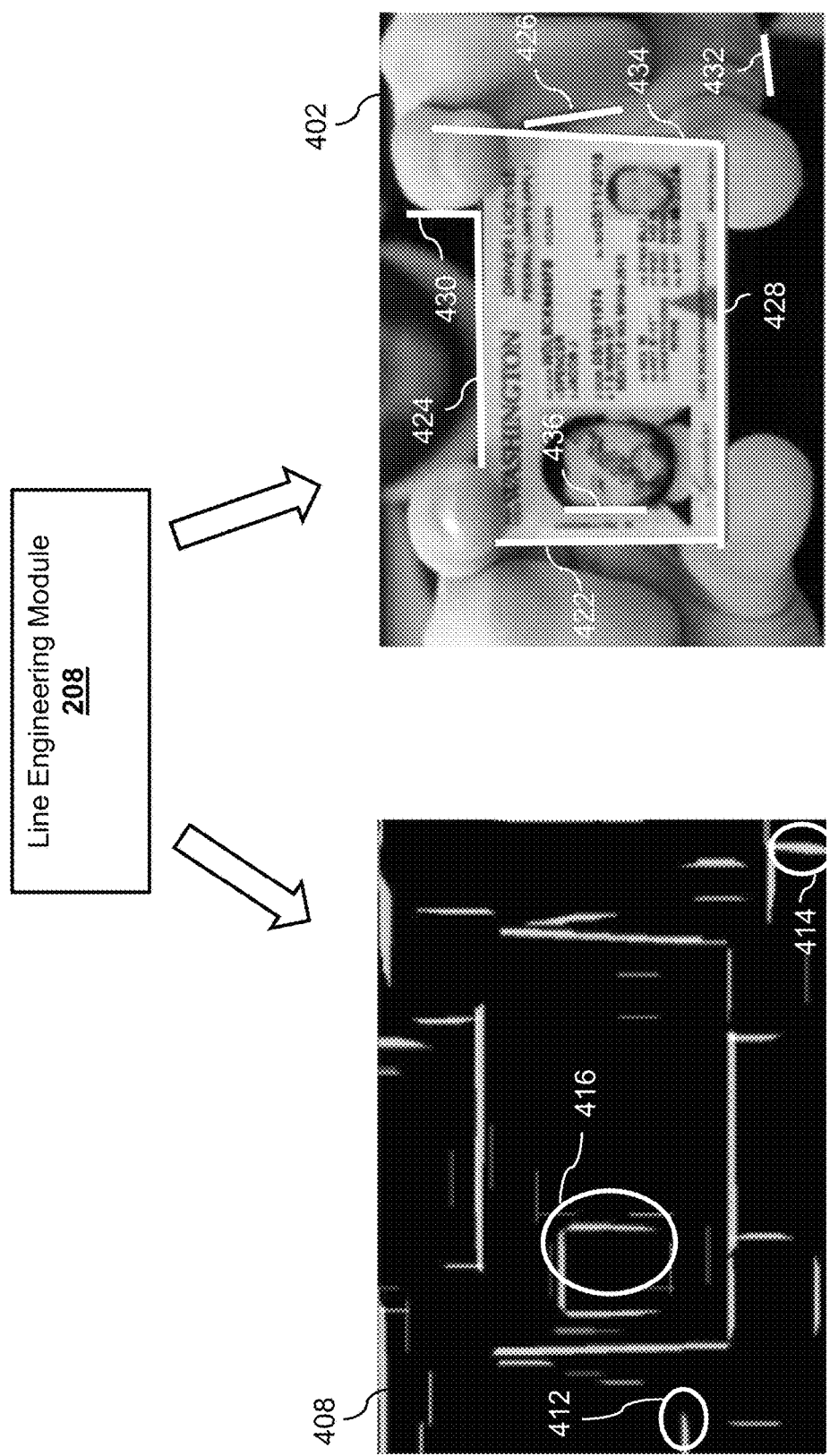
Figure 4C:
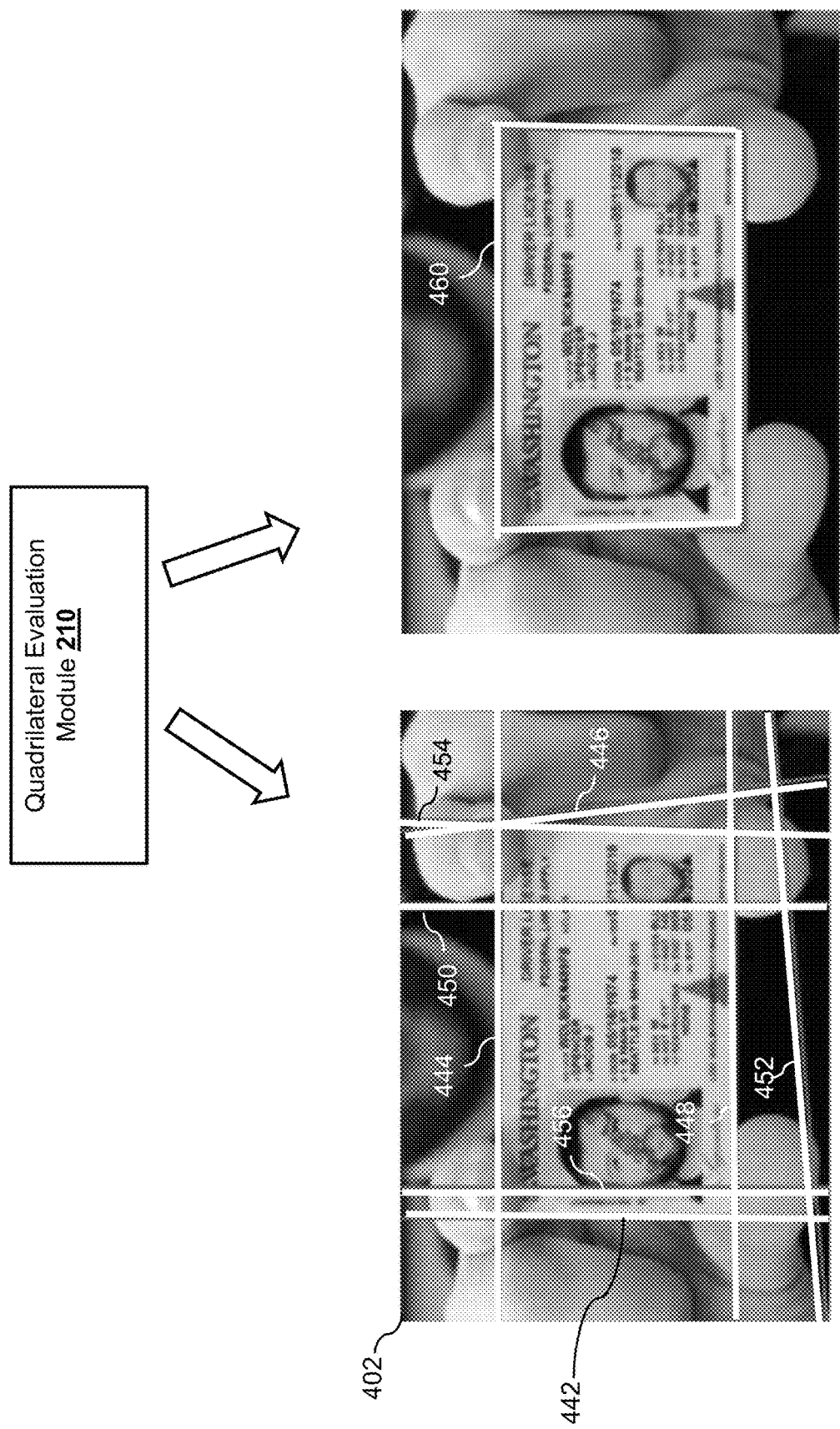

FIGS. 4A-4C illustrate another example of detecting a document within an image using the techniques disclosed herein according to some embodiments of the disclosure. In this example and as shown in FIG. 4A, the image analysis module 200 receives an image 402. The incoming image 402 may be an image captured by an image capturing device 116 of the user device 110 (or from any other user devices). The image 402 may include a document 404 that is requested by the service provider server 130. For example, the service provider server 130 requests for an identification document during a transaction workflow initiated by the user 140. The user 140 may use the image capturing device 116 to capture the image 402 of the document 404. In this example, the document 404 includes a driver's license.

The image pre-processor 204 may first convert the image 402 into a binary image 406 (e.g., each pixel in the image 406 can only be one of two values, such as '0' and '1'). In some embodiments, the image pre-processor 204 may convert the image 402 into the binary image 406 using an adaptive thresholding algorithm, where pixels that appear to be part of an edge (e.g., a border) of an object in the image 406 (e.g., having pixel values that are darker than its surrounding pixels) are highlighted. Thus, after applying the adaptive thresholding algorithm on the image 402, pixels that are part of the detected edges in the image 402 will be emphasized (e.g., having a value of '1'), as shown in white in the figure, and pixels that are not part of the detected edges in the image 402 will be de-emphasized (e.g., having a value of '0'), as shown in black in the figure.

After converting the image 402 into the binary image 406, the transformation module 206 may perform morphological transformations on the binary image 406 using a horizontal kernel and a vertical kernel. FIG. 4A illustrates a transformed binary image 408 after performing a combination of a morphological transformation using a horizontal kernel and a morphological transformation using a vertical kernel on the binary image 406. As shown, the transformed binary image 408 only includes features from the binary image 406 that are lines in a direction that are within a threshold of a horizontal direction (substantially horizontal) or within a threshold of a vertical direction (substantially vertical).

After applying the morphological transformations to the binary image 406 to generate the transformed binary image 408, the line engineering module 208 may perform one or more line processing operations on the transformed binary image 408 to eliminate any lines that are likely not associated with a border of a document 404. For example, the line engineering module 208 may use a probabilistic Hough line transformation on the binary image 408 to identify and eliminate curves (lines that are not straight within a threshold).

To further remove irrelevant lines in the binary image 408 (e.g., lines that are likely not part of the borders of the document), the line engineering module 208 may apply one or more heuristics to the binary image 308. For example, the line engineering module 208 may remove, from the binary image, any lines that cross a middle portion of the image (e.g., line 416 in FIG. 4B, etc.) and any lines that abut a side of the image (e.g., lines 412 and 414 in FIG. 4B, etc.). Furthermore, the line engineering module 208 may also merge lines that are determined to be colinear (e.g., the lines are within a threshold of being in parallel with each other and close to each other within a threshold). In FIG. 4B, the lines 422-436 remaining in the binary image 408 are superimposed onto the original image 402 to show the relative positions of the remaining lines 422-436 on the image 402.

The quadrilateral evaluation module 210 may then determine multiple quadrilateral candidates based on the remaining lines 422-436 in the binary image 408. Each quadrilateral candidate is a four-sided shape polygon constructed using two horizontal lines and two vertical lines from the remaining lines 422-436 of the binary image 408. The quadrilateral evaluation module 210 may determine that each quadrilateral candidate is a candidate for the boundary of the document 404. To generate the quadrilateral candidates, the quadrilateral evaluation module 210 of some embodiments may first extend each of the lines 422-436 in the binary image 408 such that each line abuts two sides (e.g., two horizontal sides or two vertical sides) of the binary image 308. For example, the quadrilateral evaluation module 210 may extend the line 424 to the left side and the right side of the binary image 408 to form an extended line 444. Similarly, the quadrilateral evaluation module 210 may also extend the lines 428 and 432 to the left side and the right side of the binary image 408 to form extended lines 448 and 452, respectively. The quadrilateral evaluation module 210 may also extend the lines 422, 436, 430, 434, and 426 to the top side and the bottom side of the binary image 408 to form extended lines 442, 456, 450, 454, and 446, respectively, as illustrated in FIG. 4C.

The quadrilateral evaluation module 210 may then determine multiple quadrilateral candidates based on the extended lines 442-456. In some embodiments, the quadrilateral evaluation module 210 may determine quadrilateral candidates by selecting different combinations of two horizontal lines and two vertical lines that intersect with each other. For example, the quadrilateral evaluation module 210 may determine a quadrilateral candidate based on a quadrilateral constructed using portions the extended lines 444, 448, 442, and 454. Specifically, the quadrilateral candidate consists of a portion of the extended line 444 from the intersection with the extended line 442 to the intersection with the extended line 454, a portion of the extended line 448 from the intersection with the extended line 442 to the intersection with the extended line 454, a portion of the extended line 442 from the intersection with the extended line 444 to the intersection with the extended line 448, and a portion of the extended line 454 from the intersection with the extended line 444 to the intersection with the extended line 448.

The quadrilateral evaluation module 210 may determine another quadrilateral candidate based on another quadrilateral constructed using portions of the extended lines 444, 452, 456, and 450. Specifically, the quadrilateral candidate consists of a portion of the extended line 444 from the intersection with the extended line 456 to the intersection with the extended line 450, a portion of the extended line 452 from the intersection with the extended line 456 to the intersection with the extended line 450, a portion of the extended line 456 from the intersection with the extended line 444 to the intersection with the extended line 452, and a portion of the extended line 450 from the intersection with the extended line 444 to the intersection with the extended line 452. The quadrilateral evaluation module 210 may determine as many quadrilateral candidates as desired based on the number of combinations of two horizontal lines and two vertical lines from the extended lines 442-456.

The quadrilateral evaluation module 210 may then determine a score for each quadrilateral candidate based on how well the original lines, that correspond to the extended lines used to construct the quadrilateral candidate, fit in the quadrilateral candidate using the techniques described herein. Based on the score, the quadrilateral evaluation module 210 may determine that the quadrilateral 460 constructed using the extended lines 444, 448, 442, and 454 is the boundary of the document 404 based on the score determined for the quadrilateral 460 is the best score.

Figure 5B:
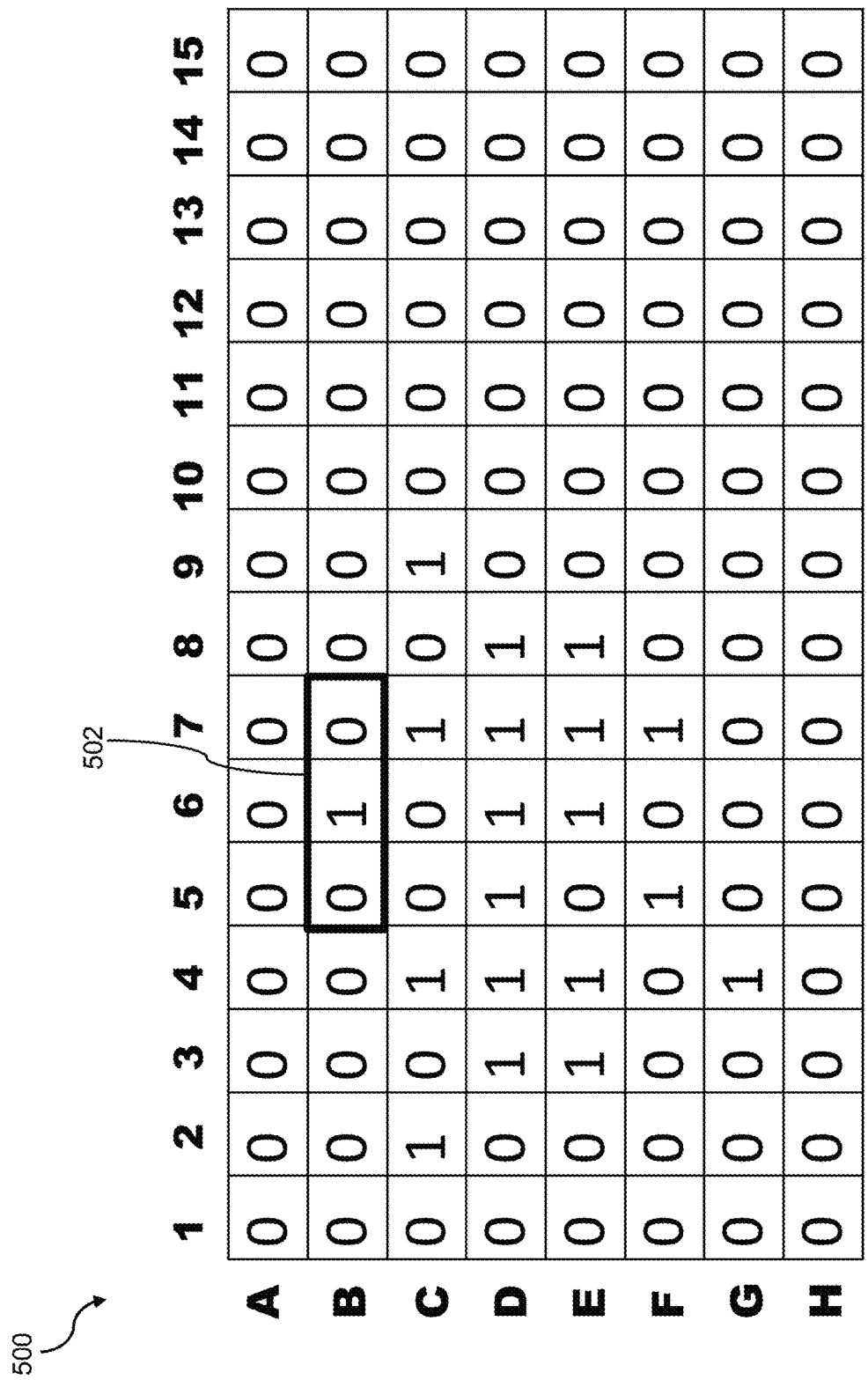

FIGS. 5A-5H illustrate performing the morphological transformations on an image using a horizontal kernel and a vertical kernel according to various embodiments of the disclosure. In some embodiments, the morphological transformations as discussed herein can be performed on the binary images 308 and 408 by the transformation module 206. FIG. 5A illustrates an example binary image 500 on which the transformation module 206 may perform one or more morphological transformations. In this example, the binary image 500 includes fifteen rows and eight columns of pixels, wherein each pixel can have a value of either '1' (highlighted) or '0' (de-emphasized). In this example, the pixels have a value of '1' at these positions of the binary image 500: B6, C2, C4, C7, C9, D3-D8, E3, E4, E6-E8, F5, F7, and G4, while all other pixels have a value of '0.'

As discussed herein, the transformation module 206 may define a horizontal kernel as a pixel block (also referred to as a "pixel window") having a larger width than its length. In this example, the transformation module 206 may define the horizontal kernel 502 as a 3×1 pixel block (or pixel window), as shown in FIG. 5B. The transformation module 206 may then perform a first morphological transformation on the image 500 based on the horizontal kernel 502. The first morphological transformation may include an erosion step and a dilation step. The erosion step is intended to de-emphasize any pixels that are not part of a horizontal edge (that do not conform to the horizontal kernel 502). In other words, the erosion step diminishes detected features (e.g., edges) in the image that do not conform with the horizontal kernel 502.

To perform the erosion step, the transformation module 206 may process the binary image 500 using the horizontal kernel 502. The transformation module 206 may first place the horizontal kernel 502 at an initial position (e.g., top left corner) in the binary image 500 such that the horizontal kernel 502 (e.g., the pixel window) is placed over the three pixels at the top left corner (e.g., the pixels A1-A3). In some embodiments, the transformation module 206 may perform an erosion process based on the pixels within the horizontal kernel 502 by determining the minimum pixel value from the pixels within the horizontal kernel 502, and replacing the value of the center pixel within the horizontal kernel 502 using the minimum pixel value of the pixels in the horizontal kernel 502. Since, the pixels at the positions A1-A3 all have the value of '0,' the transformation module 206 may not change the pixel value at the position A2 (the center pixel).

The transformation module 206 may then move the horizontal kernel 502 across by one pixel, such that the horizontal kernel 502 is placed over the three pixels at the positions A2-A4, and perform the same erosion process. Since the three pixels at the positions A2-A4 all have the value of '0,' the transformation may not change the pixel value of the center pixel (e.g., at the position A3). The transformation module 206 may continue to move the horizontal kernel 502 across one pixel at a time until it finishes performing the erosion process for the entire row (e.g., row 'A') of the binary image 500. The transformation module 206 may then move the horizontal kernel 502 to the next row (e.g., row 'B') and continue to perform the erosion process associated with the erosion step. When the transformation module 206 has placed the horizontal kernel 502 over the pixels at the positions B5-B7, the transformation module 206 may determine that the minimum pixel value of the pixels B5-B7 is '0' Since the center pixel (e.g., at the position B6) has a pixel value of '1,' the transformation module 206 may replace the pixel value of the pixel at the position B6 with the pixel value of '0' The transformation module 206 may continue to move the horizontal kernel 502 and perform the erosion process on other pixels until it has processed all of the pixels in the binary image 500.

Figure 5C:
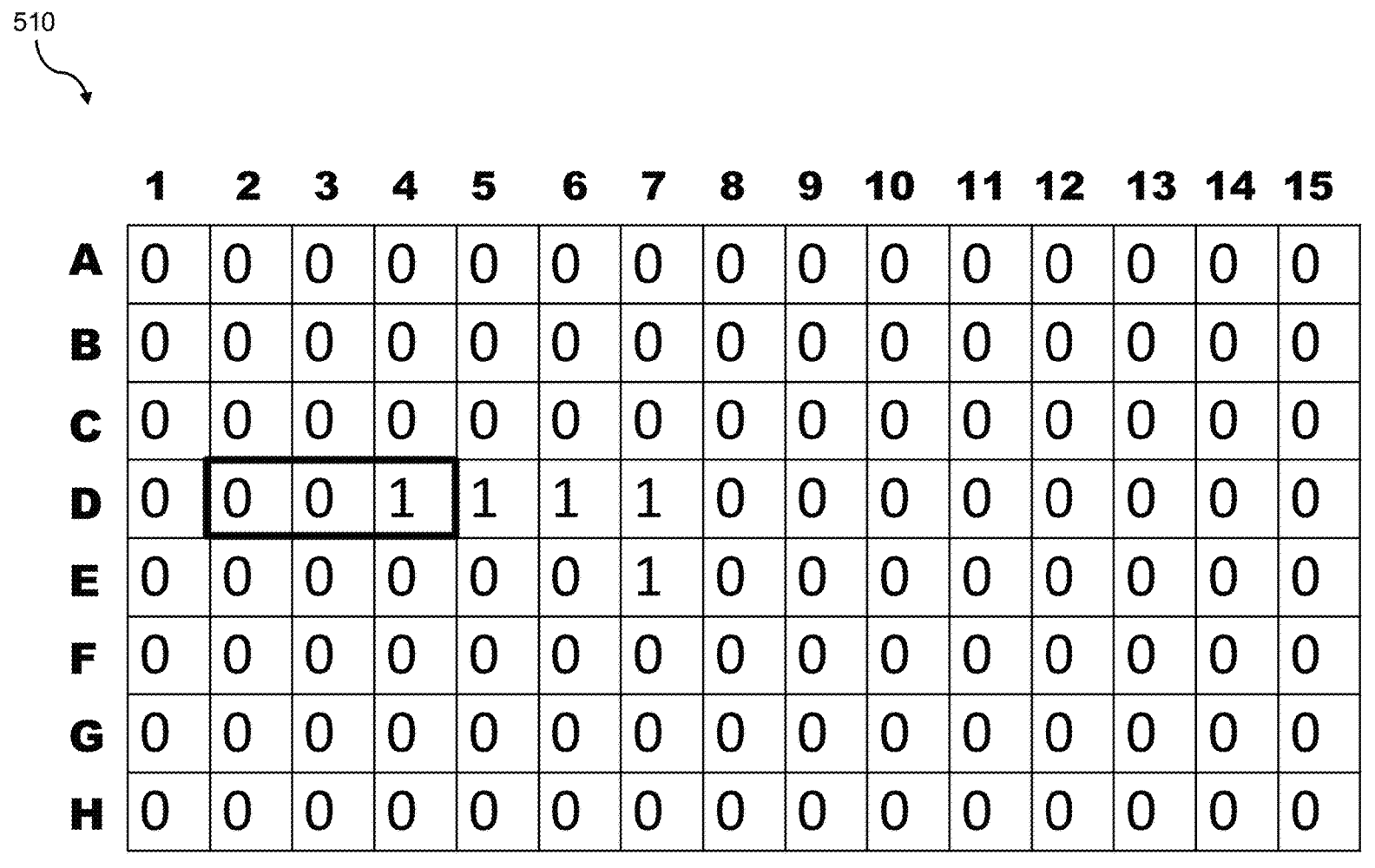

FIG. 5C illustrates a first transformed binary image 510 after performing the erosion step of the first morphological transformation on the binary image 500 using the horizontal kernel 502. As shown, the transformation module 206 has replaced the pixel values of the pixels at the positions C2, C4, C7, C9, D3, D8, E3, E4, E6, E8, F5, F7, and G4 with the pixel value of '0' based on the minimum values of the neighboring pixel values. After performing the erosion step, the transformation module 206 may perform a dilation step using the same horizontal kernel 502. The dilation step is intended to emphasize one or more regions within the digital image that are part of a horizontal edge. In other words, the dilation step accentuates detected features (e.g., edges) in the image that conforms with the horizontal kernel 502.

In some embodiments, to perform the dilation step, the transformation module 206 may place the horizontal kernel 502 at an initial position (e.g., the top left corner) of the transformed binary image 510 such that the horizontal kernel 502 overlaps with the pixels in the initial position (e.g., the positions A1-A3). The transformation module 206 may perform a dilation process based on the pixels within the horizontal kernel by determining a maximum value of the pixels within the horizontal kernel 502, and replacing the pixel value of the center pixel within the horizontal kernel 502 with the maximum value of the pixels within the horizontal kernel 502. In this example, since all of the pixels at the positions A1-A3 have a value of '0,' the transformation module 206 may not make any modification for the center pixel A2. The transformation module 206 may then move the horizontal kernel 502 across by one pixel, such that the horizontal kernel 502 is placed over the three pixels at the positions A2-A4, and perform the same dilation process. Since the three pixels at the positions A2-A4 all have the value of '0,' the transformation may not change the pixel value of the center pixel (e.g., at the position A3). The transformation module 206 may continue to move the horizontal kernel 502 over one pixel at a time until it finishes performing the dilation process for the entire row (e.g., row 'A') of the binary image 500. The transformation module 206 may then move the horizontal kernel 502 to the next row (e.g., row 'B') and continue to perform the dilation process associated with the dilation step. When the transformation module 206 has placed the horizontal kernel 502 over the pixels at the positions D2-D4, the transformation module 206 may determine that the maximum pixel value of the pixels D2-D4 is '1' (from the pixel D4). Since the center pixel (e.g., at the position D5) has a pixel value of '0,' the transformation module 206 may replace the pixel value of the pixel at the position D5 with the pixel value of '1.' The transformation module 206 may continue to move the horizontal kernel 502 and perform the dilation process on other pixels until it has processed all of the pixels in the binary image 500.

FIG. 5D illustrates a second transformed binary image 520 after performing the erosion step and then the dilation step of the first morphological transformation on the binary image 500 using the horizontal kernel 502. As shown, the transformation module 206 has replaced the pixel values of the pixels at the positions D3, D8, E6, and E8 with the pixel value of '1' based on maximum values of the neighboring pixel values. In some embodiments, the transformation module 206 may also perform a second morphological transformation on the binary image 500 using a vertical kernel.

As discussed herein, the transformation module 206 may define a vertical kernel as a pixel block (also referred to as a "pixel window") having a larger length than its width. In this example, the transformation module 206 may define the horizontal kernel 504 as a 1×3 pixel block (or pixel window), as shown in FIG. 5E. The transformation module 206 may then perform a second morphological transformation on the image 500 based on the vertical kernel 504. The second morphological transformation may also include an erosion step and a dilation step. The erosion step is intended to de-emphasize any pixels that are not part of a vertical edge (that do not conform to the vertical kernel 504). In other words, the erosion step diminishes detected features (e.g., edges) in the image that do not conform with the vertical kernel 504.

To perform the erosion step, the transformation module 206 may process the binary image 500 using the vertical kernel 502. For example, the transformation module 206 may place the vertical kernel 504 at an initial position (e.g., top left corner) in the binary image 500 such that the vertical kernel 504 (e.g., the pixel window) is placed over the three pixels at the top left corner (e.g., the pixels A1, B1, and C1). In some embodiments, the transformation module 206 may perform the erosion process based on the pixels within the vertical kernel 504 by determining the minimum pixel value from the pixels within the vertical kernel 504, and replacing the value of the center pixel within the horizontal kernel 504 using the minimum pixel value of the pixels in the vertical kernel 504. Since, the pixels at the positions A1, B1, and C1 all have the value of '0,' the transformation module 206 may not change the pixel value at the position B1 (the center pixel).

The transformation module 206 may then move the vertical kernel 504 down by one pixel, such that the vertical kernel 504 is placed over the three pixels at the positions B1, C1, and D1, and perform the same erosion process. Since the three pixels at the positions B1, C1, and D1 all have the value of '0,' the transformation may not change the pixel value of the center pixel (e.g., at the position C1). The transformation module 206 may continue to move the vertical kernel 504 down one pixel at a time until it finishes performing the erosion process for the entire column (e.g., column '1') of the binary image 500. The transformation module 206 may then move the vertical kernel 504 to the next column (e.g., column '2') and continue to perform the erosion process associated with the erosion step. When the transformation module 206 has placed the vertical kernel 504 over the pixels at the positions B2, C2, and D2, the transformation module 206 may determine that the minimum pixel value of the pixels B2, C2, and D2 is '0' Since the center pixel (e.g., at the position C2) has a pixel value of '1,' the transformation module 206 may replace the pixel value of the pixel at the position C2 with the pixel value of '0' The transformation module 206 may continue to move the vertical kernel 504 and perform the erosion process on other pixels until it has processed all of the pixels in the binary image 500.

Figure 5F:
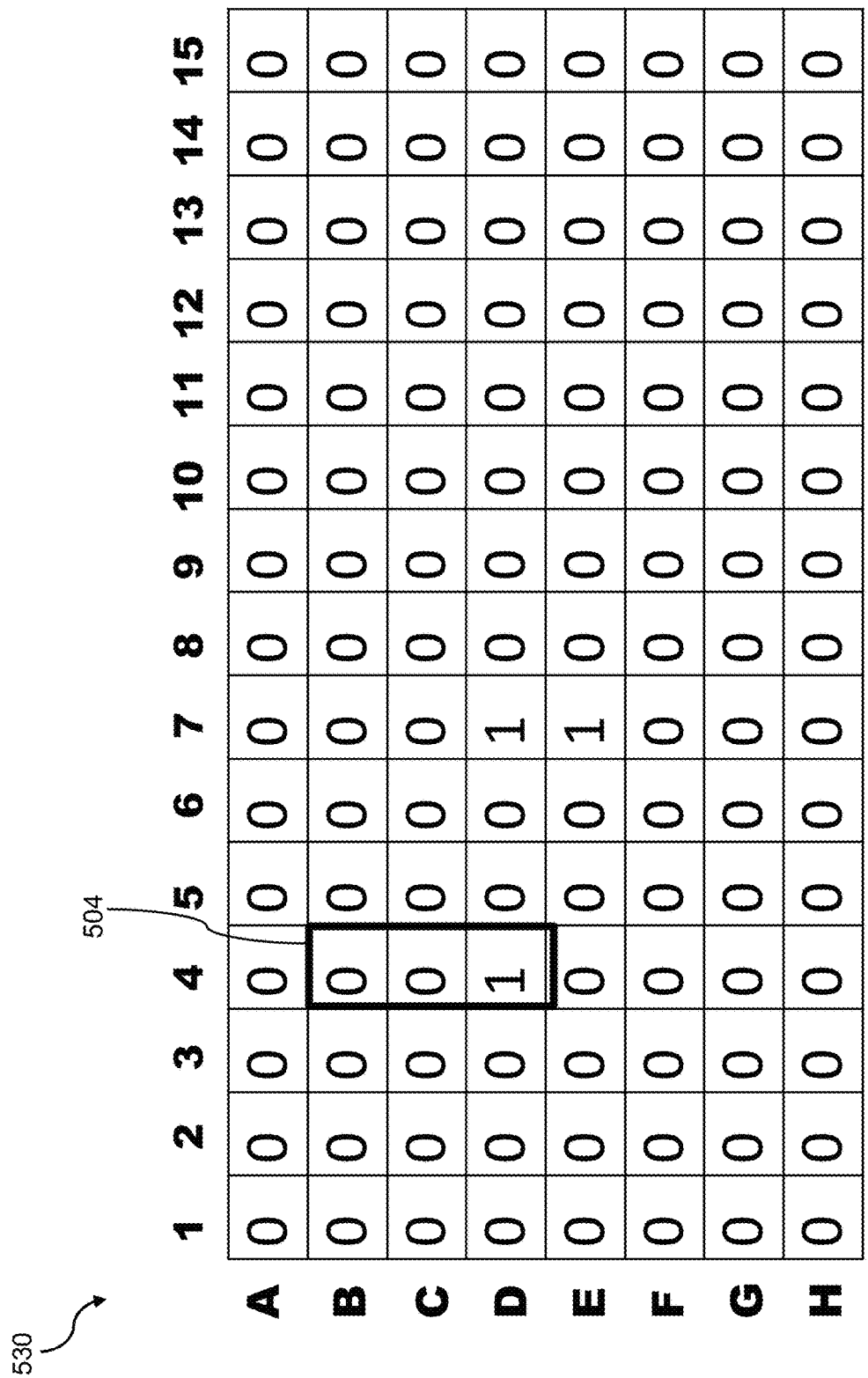

FIG. 5F illustrates a third transformed binary image 530 after performing the erosion step of the second morphological transformation on the binary image 500 using the vertical kernel 504. As shown, the transformation module 206 has replaced the pixel values of the pixels at the positions C2, D3, E3, C4, E4, G4, D5, F5, B6, D6, E6, C7, F7, D8, E8, and C9 with the pixel value of '0' based on the minimum values of the neighboring pixel values. After performing the erosion step, the transformation module 206 may perform a dilation step using the same vertical kernel 504. The dilation step is intended to emphasize one or more regions within the digital image that are part of a vertical edge. In other words, the dilation step accentuates detected features (e.g., edges) in the image that conforms with the vertical kernel 504.

In some embodiments, to perform the dilation step, the transformation module 206 may place the vertical kernel 504 at an initial position (e.g., the top left corner) of the third transformed binary image 530 such that the vertical kernel 504 overlaps with the pixels in the initial position (e.g., the positions A1, B1, and C1). The transformation module 206 may perform the dilation process based on the pixels within the vertical kernel 504 by determining a maximum value of the pixels within the vertical kernel 504, and replacing the pixel value of the center pixel within the vertical kernel 504 with the maximum value of the pixels within the vertical kernel 504. In this example, since all of the pixels at the positions A1, B1, and C1 have a value of '0,' the transformation module 206 may not make any modification for the center pixel B1. The transformation module 206 may then move the vertical kernel 504 down by one pixel, such that the vertical kernel 504 is placed over the three pixels at the positions B1, C1, and D1, and perform the same dilation process. Since the three pixels at the positions B1, C1, and D1 all have the value of '0,' the transformation may not change the pixel value of the center pixel (e.g., at the position C1). The transformation module 206 may continue to move the vertical kernel 504 down one pixel at a time until it finishes performing the dilation process for the entire column (e.g., column '1') of the binary image 530. The transformation module 206 may then move the vertical kernel 504 to the next column (e.g., column '2') and continue to perform the dilation process associated with the dilation step. When the transformation module 206 has placed the vertical kernel 504 over the pixels at the positions B4, C4, and D4, the transformation module 206 may determine that the maximum pixel value of the pixels B4, C4, and D4 is '1' (from the pixel D4). Since the center pixel (e.g., at the position C4) has a pixel value of '0,' the transformation module 206 may replace the pixel value of the pixel at the position C4 with the pixel value of '1.' The transformation module 206 may continue to move the vertical kernel 504 and perform the dilation process on other pixels until it has processed all of the pixels in the binary image 500.

FIG. 5G illustrates a fourth transformed binary image 540 after performing the dilation step of the second morphological transformation on the binary image 500 using the vertical kernel 504. As shown, the transformation module 206 has replaced the pixel values of the pixels at the positions C4, E4, C7, and F7 with the pixel value of '1' based on maximum values of the neighboring pixel values. After performing the two morphological transformations using the horizontal kernel 502 and the vertical kernel 504, respectively, the transformation module 206 may combined the two transformed binary images (e.g., the second transformed binary image 520 and the fourth transformed binary image 540) to form a combined transformed binary image. FIG. 5H illustrates a combined transformed binary image 550 by combining the second transformed binary image 520 and the fourth transformed binary image 540, wherein each pixel in the combined transformed binary image 550 has a pixel value of '1' when a corresponding pixel in the second transformed binary image 520 has a pixel value of '1' and/or a corresponding pixel in the fourth transformed binary image 540 has a pixel value of '1.' It is noted that since the first and second morphological transformations can be performed independent of each other (each of the morphological transformation is performed on the original binary image 500), the two morphological transformations can be performed in different ordered, or in parallel.

Figure 6:
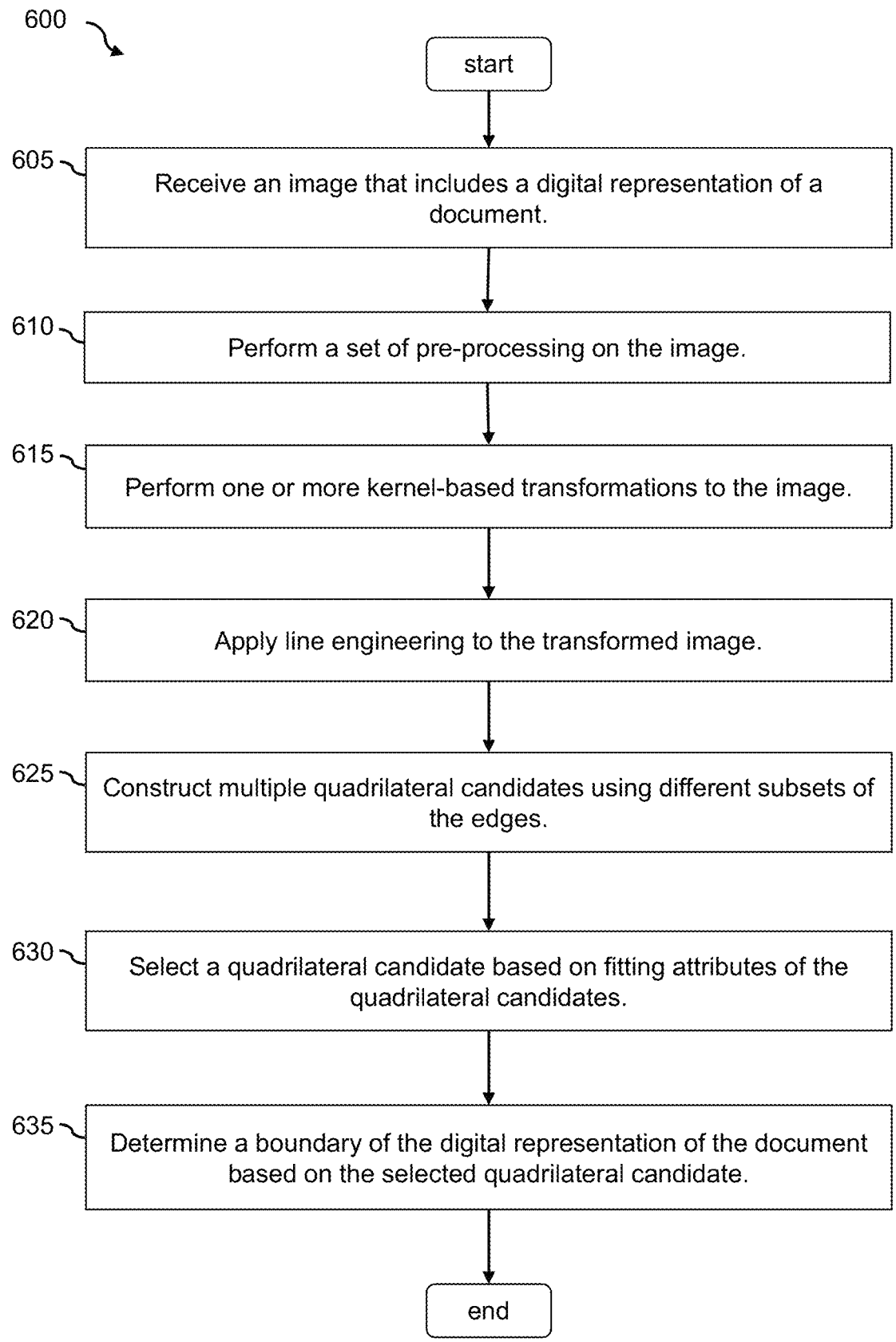
FIG. 6 is a flowchart showing a process of detecting a boundary of a document within a digital image according to an embodiment of the present disclosure.

FIG. 6 illustrates a process 600 for detecting a boundary of a document within a digital image according to various embodiments of the disclosure. In some embodiments, at least a portion of the process 600 may be performed by the image analysis module 118, the image analysis module 132, and/or the image analysis module 200. The process 600 begins by receiving (at step 605) an image that includes a digital representation of a document. For example, the interface server 134 may receive an image from the user interface application 112 of the user device 110, or from any one of the other user devices (e.g., the user device 180, the user device 190, etc.). The process 600 performs (at step 610) a set of pre-processing operations on the image. For example, the image pre-processor 204 may perform one or more pre-processing operations on the image, such as sharpening, noise-reduction, or other operations for enhancing a quality of the image. In some embodiments, the pre-processor 204 also converts the image into a binary image (where each pixel can only have one of two pixel values such as '0' and '1'). For example, the pre-processor 204 may converts the image into a binary image based on a luminance dimension such that a pixel having a luminance value higher than a threshold is assigned one of the two pixel values (e.g., '1') and a pixel having a luminance value below the threshold is assigned another one of the two pixel values (e.g., '0').

The process 600 then performs one or more kernel-based transformations to the image. The one or more kernel-based transformations may include a first morphological transformation using a horizontal kernel and a second morphological transformation using a vertical kernel. The kernel-based transformations are intended to suppress features on the image that are not associated with horizontal and vertical lines and to accentuate features on the image that are associated with horizontal line and vertical lines.

The process 600 also applies (at step 620) line engineering to the transformed image. The line engineering may eliminate some of the lines that are determined to be likely not associated with a border of a document. For example, the line engineering module 208 may identify and eliminate lines that abut a side of the image, may identify and eliminate lines that crosses a middle portion of the image, and may merge substantially colinear lines.

After performing the line engineering to the transformed image, the process 600 constructs (at step 625) multiple quadrilateral candidates using different subsets of the edges. For example, the quadrilateral evaluation module 210 may use the remaining lines on the transformed image to determine multiple quadrilateral candidates. The quadrilateral candidates may be constructed using different combinations of subsets of the two horizontal lines and two vertical lines from the remaining lines.

The process 600 selects (at step 630) a quadrilateral candidate based on fitting attributes of the quadrilateral candidates and determines (at step 635) a boundary of the digital representation of the document based on the selected quadrilateral candidate. For example, the quadrilateral evaluation module 210 may determine, for each quadrilateral candidate, a score that represents how well the lines used to construct the quadrilateral candidate fit the quadrilateral candidate. The quadrilateral evaluation module 210 may select a quadrilateral candidate having the best score (e.g., the lines have the best fitting for the quadrilateral candidate). The image analysis manager 202 may use the selected quadrilateral candidate to define the boundary of the document within the image. The image analysis manager 202 may analyze the document based on the defined boundary. The image analysis 202 may perform different actions (e.g., transmitting the image to the service provider server 130, prompting the user to resubmit the image, prompting the user to submit an image of a different document, etc.) based on the analysis of the image.

Figure 7:
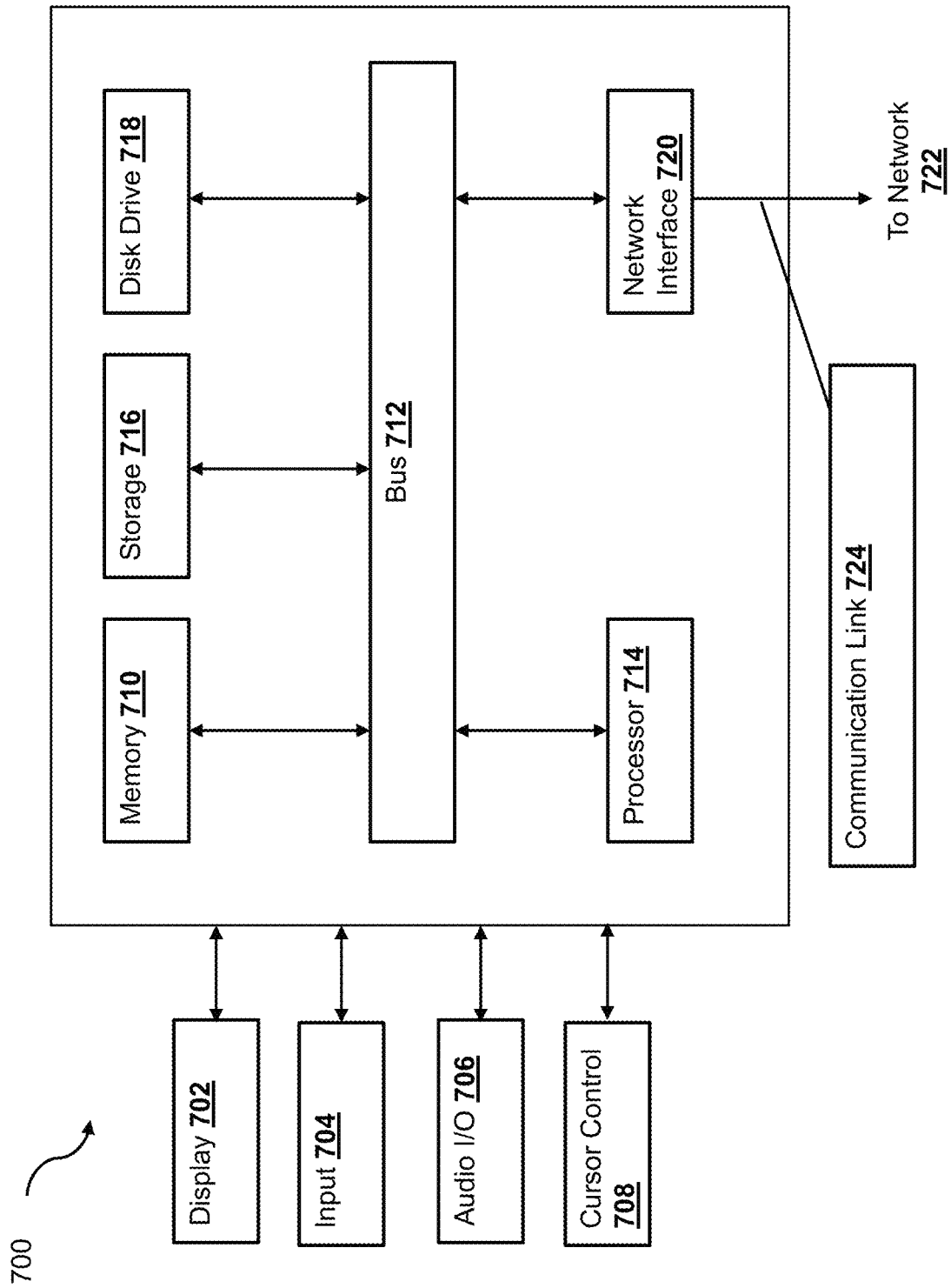
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, the merchant server 120, and the user devices 110, 180, and 190. In various implementations, each of the devices 110, 180, and 190 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices/servers 110, 120, 130, 180, and 190 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 804 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via a network 722, such as network 160 of FIG. 1. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 800 performs specific operations by the processor 714 and other components by executing one or more sequences of instructions contained in the system memory component 710. For example, the processor 714 can perform the document detection functionalities described herein according to the process 600.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
receiving an image comprising a digital representation of a document;
generating a first transformed image based on performing a first transformation to the image using a horizontal line kernel;
identifying a plurality of horizontal edges on the image based on the first transformed image;
generating a second transformed image based on performing a second transformation to the image using a vertical line kernel;
identifying a plurality of vertical edges on the image based on the second transformed image;
constructing a quadrilateral using two vertical edges from the plurality of vertical edges and two horizontal edges from the plurality of horizonal edges; and
extracting a portion of the image within the quadrilateral as the digital representation of the document.

2. The system of claim 1, wherein the operations further comprise:
constructing a plurality of quadrilateral candidates based on the plurality of vertical edges and the plurality of horizontal edges, wherein each quadrilateral candidate in the plurality of quadrilateral candidates is constructed using a different subset of edges from the plurality of vertical edges and the plurality of horizontal edges;
evaluating the plurality of quadrilateral candidates based on fitting attributes associated with the plurality of quadrilateral candidates, wherein a fitting attribute associated with each corresponding quadrilateral candidate in the plurality of quadrilateral candidates indicates how well edges used to construct the corresponding quadrilateral candidate fit in the corresponding quadrilateral candidate; and
selecting, from the plurality of quadrilateral candidates, a quadrilateral candidate as the quadrilateral based on the evaluating.

3. The system of claim 2, wherein the operations further comprise:
computing a first score for a first quadrilateral candidate in the plurality of quadrilateral candidates, wherein the first quadrilateral candidate is associated with a first set of edges used to construct the first quadrilateral candidate, and wherein the first score is computed based on a difference between a total length of the first set of edges and a perimeter of the first quadrilateral candidate.

4. The system of claim 2, wherein the operations further comprise:
identifying, from the plurality of quadrilateral candidates, two or more quadrilateral candidates having associated fitting attributes within a threshold, wherein the two or more quadrilateral candidates comprise the quadrilateral candidate; and
determining, from the two or more quadrilateral candidates, the quadrilateral candidate based on sizes associated with the two or more quadrilateral candidates.

5. The system of claim 4, wherein the quadrilateral candidate has the largest size among the two or more quadrilateral candidates.

6. The system of claim 1, wherein the operations further comprise converting the image to a binary image.

7. The system of claim 1, wherein the operations further comprise verifying the quadrilateral based on at least one of a size of the quadrilateral or a location of the quadrilateral within the image.

8. A method, comprising:
receiving, by one or more hardware processors, an image of a document;
generating, by the one or more hardware processors, a first transformed image based on performing a first transformation to the image using a horizontal line kernel;
generating, by the one or more hardware processors, a second transformed image based on performing a second transformation to the image using a vertical line kernel;
identifying, by the one or more hardware processors, a plurality of edges within the image based on the first transformed image and the second transformed image, wherein the identifying plurality of edges comprises identifying a plurality of horizontal edges within the image based on the first transformed image and identifying a plurality of vertical edges within the image based on the second transformed image;
constructing, by the one or more hardware processors, a plurality of quadrilaterals based on the plurality of edges, wherein each quadrilateral in the plurality of quadrilaterals is constructed using different subset of edges in the plurality of edges;
selecting, by the one or more hardware processors, from the plurality of quadrilaterals, a particular quadrilateral based on a metric representing how well edges used to construct each corresponding quadrilateral in the plurality of quadrilaterals match a perimeter of the corresponding quadrilateral; and
extracting, by the one or more hardware processors, a portion of the image based on the particular quadrilateral.

9. The method of claim 8, further comprising removing at least one edge from the plurality of edges identified within the image based on the at least one edge abutting a side of the image.

10. The method of claim 8, further comprising removing at least one edge from the plurality of edges identified within the image based on the at least one edge being located within a threshold from a center of the image.

11. The method of claim 8, further comprising merging two edges from the plurality of edges based on the two edges being colinear with each other within a threshold.

12. The method of claim 8, wherein the image is part of a video stream captured by a user device.

13. The method of claim 8, further comprising:
deriving data based on analyzing the extracted portion of the image; and
storing the data in a data storage in association with a user account of a service provider.

14. The method of claim 8, wherein the image is displayed on a user device, and wherein the method further comprises superimposing the quadrilateral on the image displayed on the user device.

15. A non-transitory machine-readable medium having stored thereon machine-readable instructions executable to cause a machine to perform operations comprising:
transforming an image based on (i) performing a first kernel-based transformation to the image using a horizontal line kernel and (ii) performing a second kernel-based transformation to the image using a vertical line kernel;

determining a plurality of edges in the transformed image;

constructing a quadrilateral using a subset of the plurality of edges; and detecting a boundary of a document within the image based on the quadrilateral.

16. The non-transitory machine-readable medium of claim 15, wherein the operations further comprise:

extracting a portion of the image within the quadrilateral as a digital representation of the document; and analyzing data within the portion of the image.

17. The non-transitory machine-readable medium of claim 16, wherein the operations further comprise:

determining that the document within the image corresponds to a document type requested by a service provider; and transmitting the image to a service provider server.

18. The non-transitory machine-readable medium of claim 16, wherein the image is captured on a user device, and wherein the operations further comprise:

determining that the document within the image does not correspond to a document type requested by a service provider; and presenting, on the user device, a notification to prompt a user of the user device to submit a second document or resubmit the document.

19. The non-transitory machine-readable medium of claim 15, wherein at least one of the first kernel-based transformation or the second kernel-based transformation comprises a morphological transformation.

20. The non-transitory machine-readable medium of claim 15, wherein the operations further comprise:

verifying the quadrilateral based on at least one of a size of the quadrilateral or a location of the quadrilateral within the transformed image.

* * * * *